United States Patent
Lyons et al.

(10) Patent No.: US 11,634,229 B1
(45) Date of Patent: Apr. 25, 2023

(54) HYDROGEN FUEL CELL PROPULSION SYSTEM

(75) Inventors: Karen Swider Lyons, Alexandria, VA (US); Richard J Foch, Upper Marlboro, MD (US); Gregory Page, Arnold, MD (US); Michael Schuette, Vienna, VA (US); Aaron D. Kahn, Alexandria, VA (US); Richard Stroman, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 3550 days.

(21) Appl. No.: 12/803,051

(22) Filed: Apr. 5, 2011

Related U.S. Application Data

(60) Provisional application No. 61/135,544, filed on Apr. 5, 2010.

(51) Int. Cl.
*B64D 27/02* (2006.01)
*B64D 41/00* (2006.01)

(52) U.S. Cl.
CPC .......... *B64D 27/02* (2013.01); *B64C 2201/04* (2013.01); *B64C 2201/06* (2013.01); *B64D 2041/005* (2013.01)

(58) Field of Classification Search
CPC ............ B64C 2201/04; B64C 2201/06; B64D 27/02; B64D 2041/05

USPC ........ 244/53 R, 62; 429/434, 436, 505, 515, 429/422
See application file for complete search history.

(56) References Cited

U.S. PATENT DOCUMENTS

| | | |
|---|---|---|
| 6,868,314 B1 | 3/2005 | Frink |
| 7,303,166 B2 | 12/2007 | Geery |

OTHER PUBLICATIONS

Stroman et al., "Developement and Integration of Controls for a PEMFC Powered Aircraft" *ECS Trans.*, 11, 1493-1504 (2007).

*Primary Examiner* — J. Woodrow Eldred
(74) *Attorney, Agent, or Firm* — US Naval Research Laboratory; Joseph T. Grunkemeyer

(57) ABSTRACT

Disclosed herein is a system comprising: a hydrogen fuel cell; a fuel storage tank; a regulator coupled to the storage tank and the fuel cell; an electronic auto pilot; a rechargeable battery; a power electronics module for delivering power from the fuel cell to the autopilot and the battery; and a heat exchanger coupled to the fuel cell. The fuel cell is characterized by: a minimum continuous power output of no more than 25 W; a maximum continuous power output of no less than 5000 W; a specific power of at least 200 W/kg based on the mass of the fuel cell and any control electronics, cooling components, air delivery components, and water management components; an ability to operate at least 2 psig of hydrogen at an inlet; and an ability to operate at temperatures up to 90° C.

5 Claims, 17 Drawing Sheets

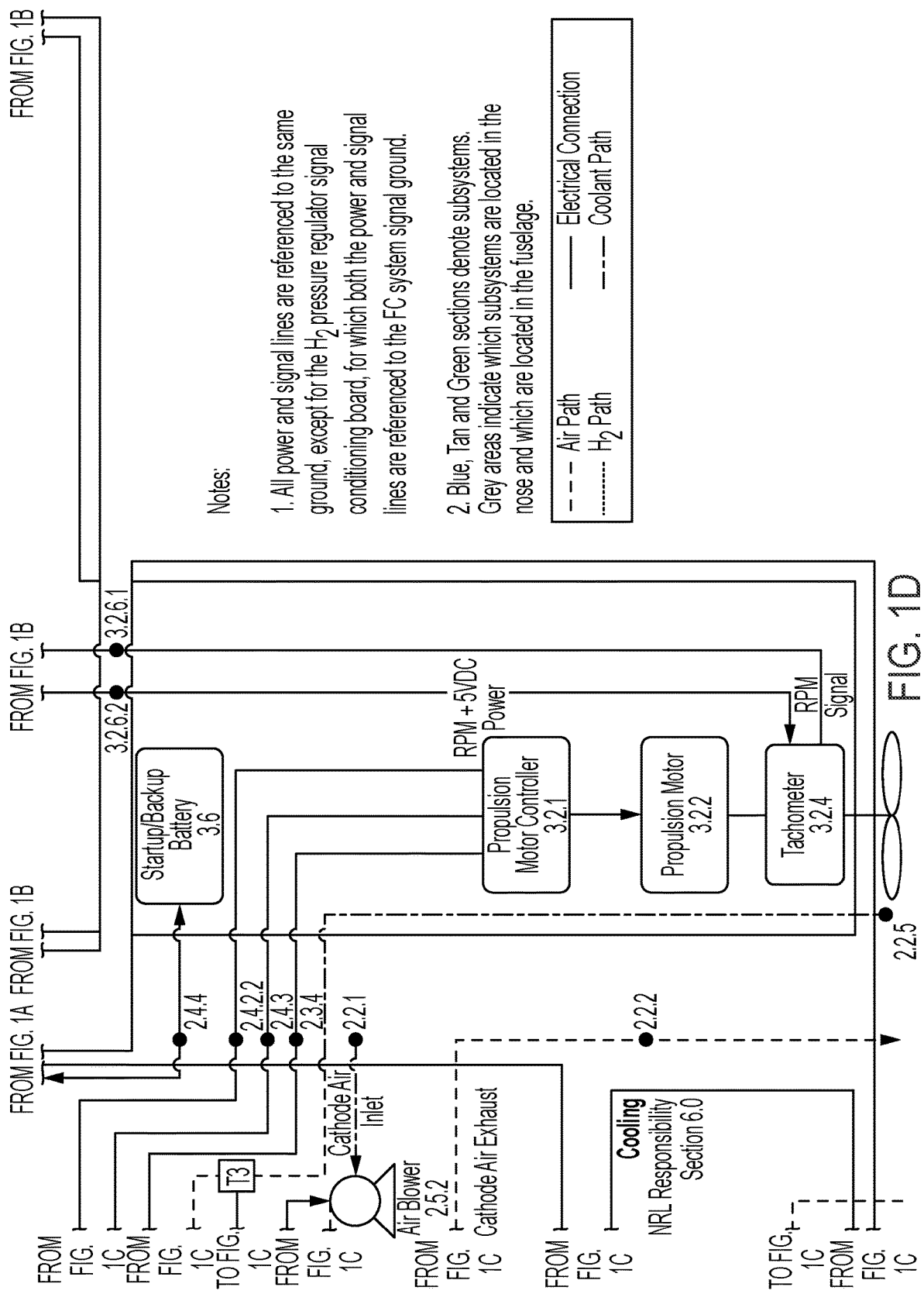

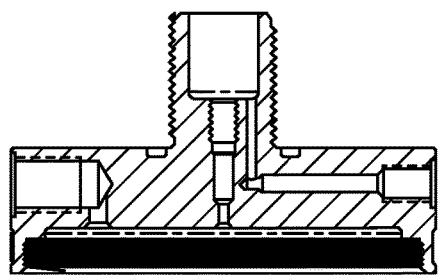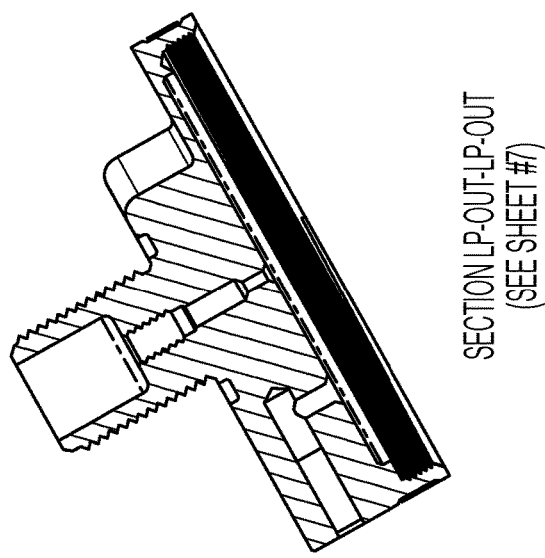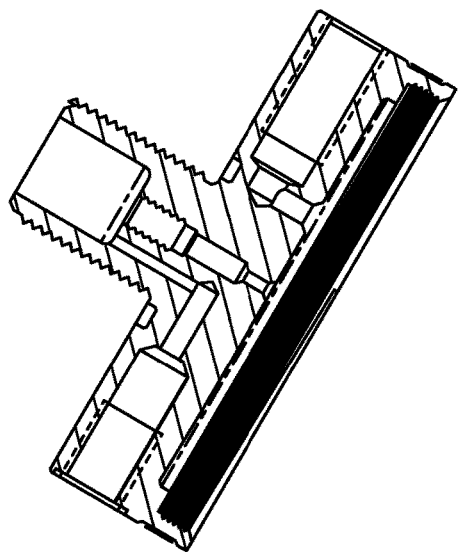
FIG. 3A

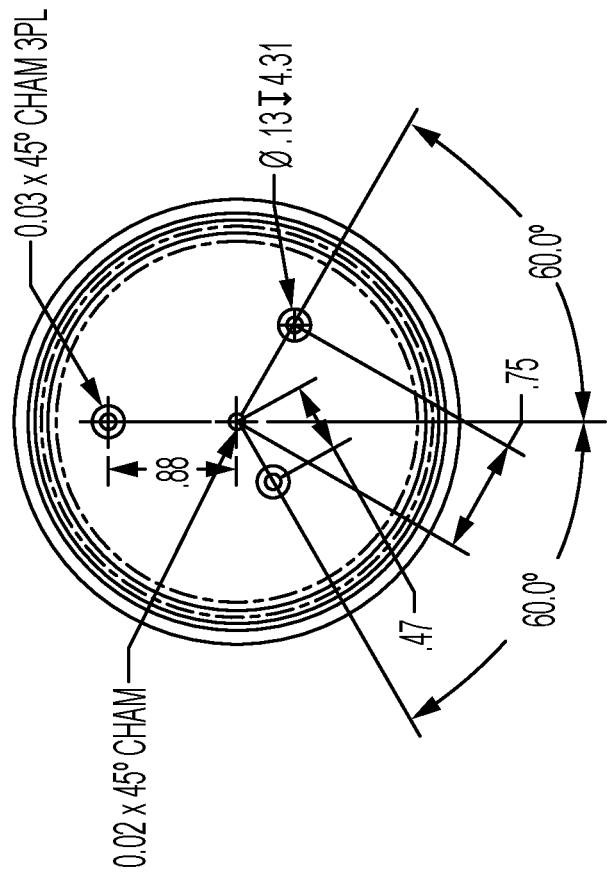
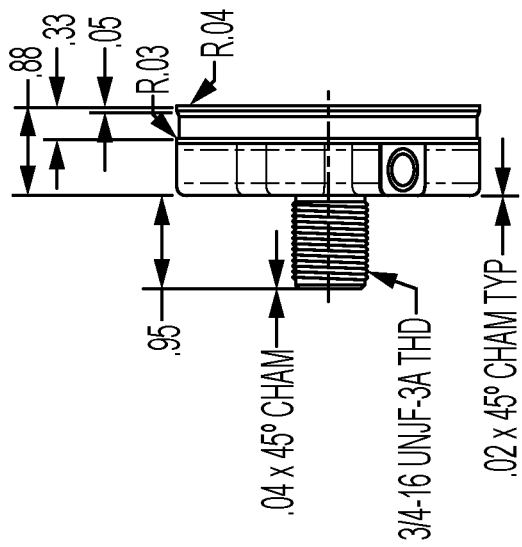
FIG. 4B

HYDROGEN FUEL CELL PROPULSION SYSTEM

This application claims the benefit of U.S. Provisional Application No. 61/135,544, filed on Apr. 5, 2010. The provisional application and all other publications and patent documents referred to throughout this nonprovisional application are incorporated herein by reference.

Technical Field

The present disclosure is generally related to fuel cells.

Description of Related Art

General fuel cells have been suggested to be used as the propulsion system of an unmanned air vehicle system, but no details are actually given about such system, and fuel cells are only mentioned as a possible propulsion source.

U.S. Pat. No. 7,303,166 discloses an airship and suggests that the power could be provided by fuel cell, but no details are given about the fuel cell.

U.S. Pat. No. 6,868,314 discusses that a fuel cell could be the propulsion plant for an unmanned aerial vehicle, but gives no information on how to implement it.

Fuel cell propulsion systems for automotive systems are made from fuel cells, radiator, and hydrogen tank assemblies. However the systems are typically sized to be on the order of 50 to 100 kW. They are not lightweight, and thus are unsuited for unmanned air vehicles.

The US Naval Research Laboratory (NRL) demonstrated a hydrogen/polymer fuel cell system for propulsion of a UAV in July 2005, and succeeded in flying for 3.3 hrs in November 2005. This 2.7-kg "Spider Lion" system, which was built from commercial off the shelf parts, carried a 0.7-kg 95-W fuel cell system from Protonex Technology Corporation and a 1 kg hydrogen fuel system (tank and regulator). Air was introduced into the fuel cell with small pumps. The net specific power of the fuel cell was 135 W/kg with a full (fueled) system power of 56 W/kg for the 3.3 hr flight. It used a dual stage gas regulator on a zylon and carbon-overwrapped aluminum pressure vessel used to store hydrogen at 5000 psi. It also had an external (surface) fin and tube radiator. It did not carry an autopilot and was flown by radio control. It also did not carry a payload (e.g, camera or radio). The total propulsion system contributed about 65% to the gross take off weight (GTOW) of the vehicle.

The specifics of the Spider-Lion system were described in a paper: "Testing of a PEM Fuel Cell System for Small UAV Propulsion," By R. Stroman, J. C. Kellogg, and Karen Swider-Lyons, Proceedings of the 42nd Power Sources Conference, 12-14 June 2006, p. 487.

The Spider Lion system had marginal benefit over conventional lithium batteries used in UAVs, because for the same weight, the batteries and fuel cell system would have the same energy. Further, the fuel cell had lower power than batteries. The fuel cell system also could not be operated in weather conditions greater than about 90° F. without overheating due to an inadequate cooling system. The work described in this patent was done subsequently to ensure that a UAV could be flown in tactical conditions, e.g., fly in persistent and strong head or tail winds, climb for extended periods, high temperatures, high altitudes, with an autopilot and appreciable payload.

BRIEF SUMMARY

Disclosed herein is a system comprising: a hydrogen fuel cell; a fuel storage tank; a regulator coupled to the storage tank and the fuel cell; an electronic auto pilot; a rechargeable battery; a power electronics module for delivering power from the fuel cell to the autopilot and the battery; and a heat exchanger coupled to the fuel cell. The fuel cell comprises a fuel cell stack, control electronics, and cooling, air delivery and water management subsystems. The fuel cell is characterized by: a minimum continuous power output of no more than 25 W; a maximum continuous power output of no less than 5000 W; a specific power of at least 200 W/kg; an ability to operate at least 2 psig of hydrogen at an inlet; and an ability to operate at temperatures up to 90° C.

BRIEF DESCRIPTION OF THE DRAWINGS

A more complete appreciation of the invention will be readily obtained by reference to the following Description of the Example Embodiments and the accompanying drawings.

FIGS. 1A-D show a system schematic of the Ion Tiger system.

FIGS. 3A-B, 4A-B, and 5-8 show drawings for the regulator.

DETAILED DESCRIPTION OF EXAMPLE EMBODIMENTS

Figure 1A:
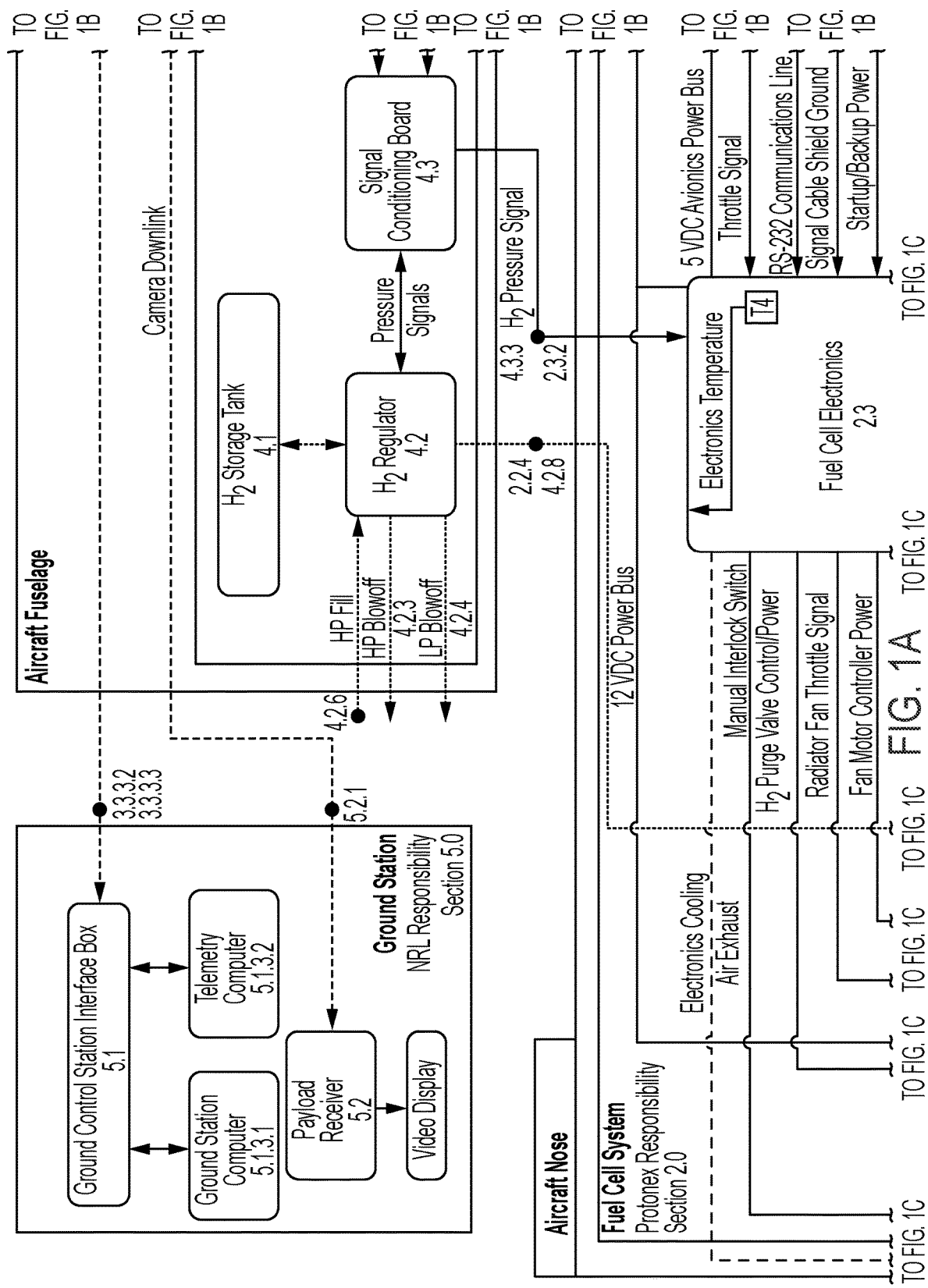
Figure 1B:
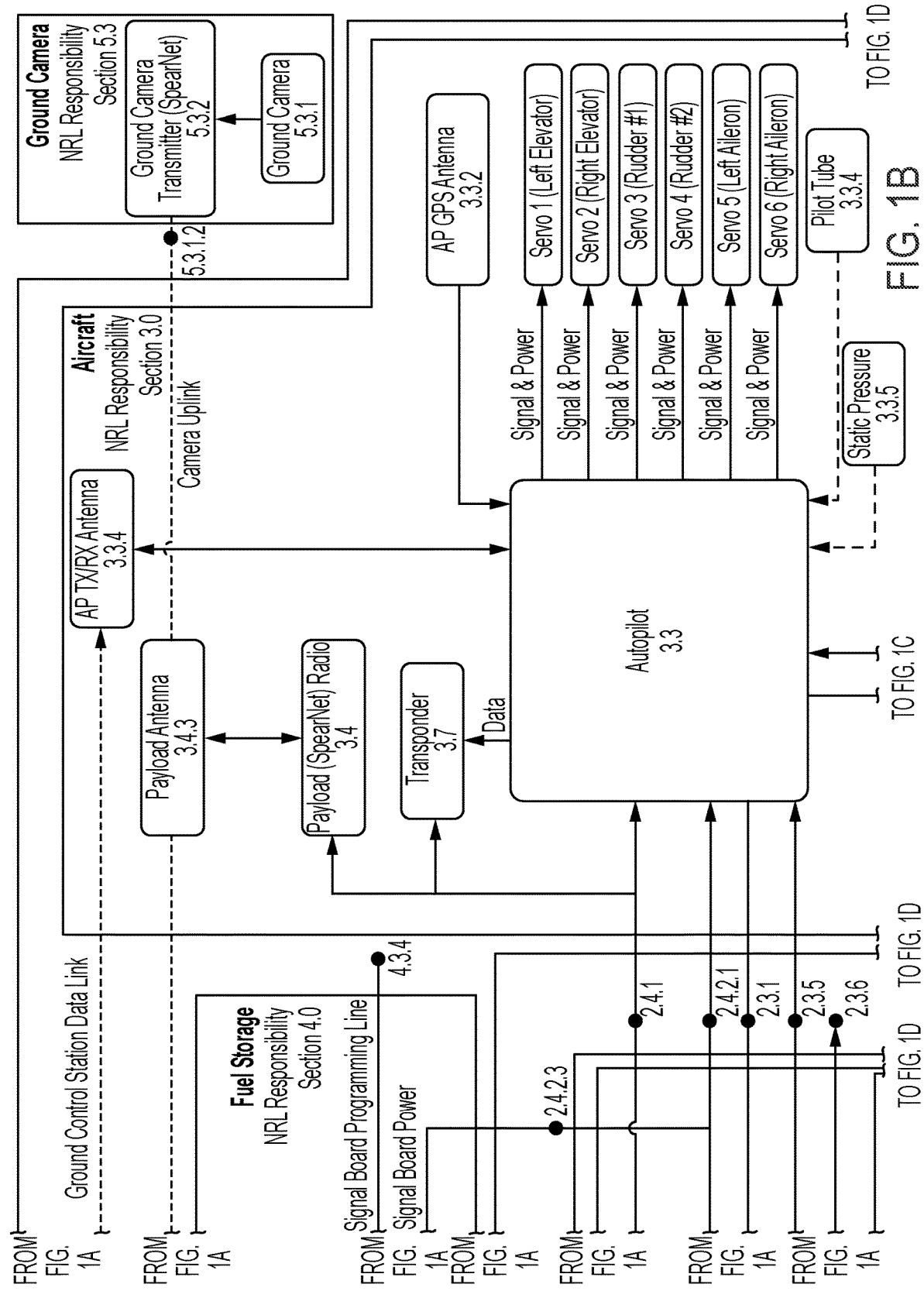
Figure 1C:
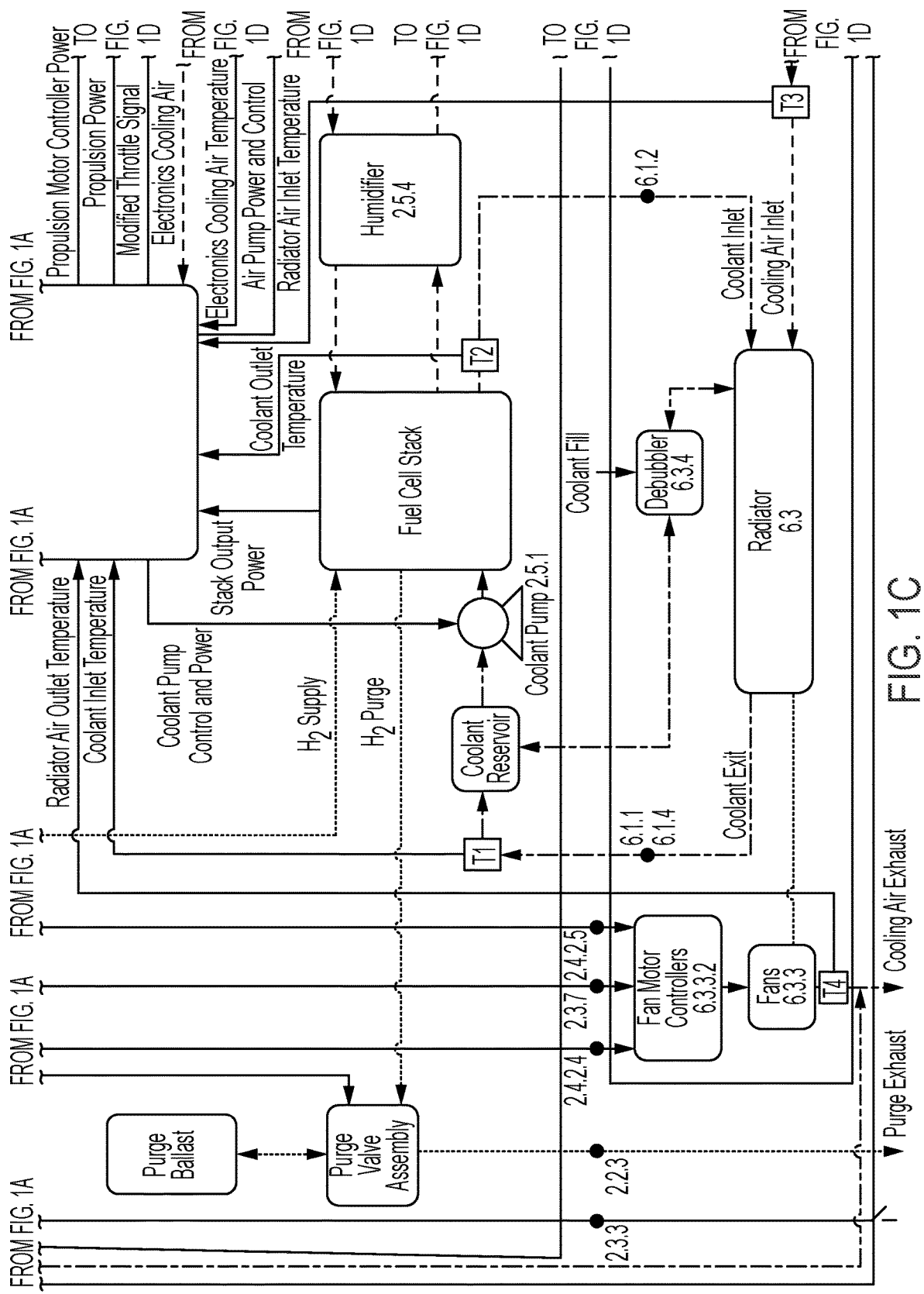
Figure 2:
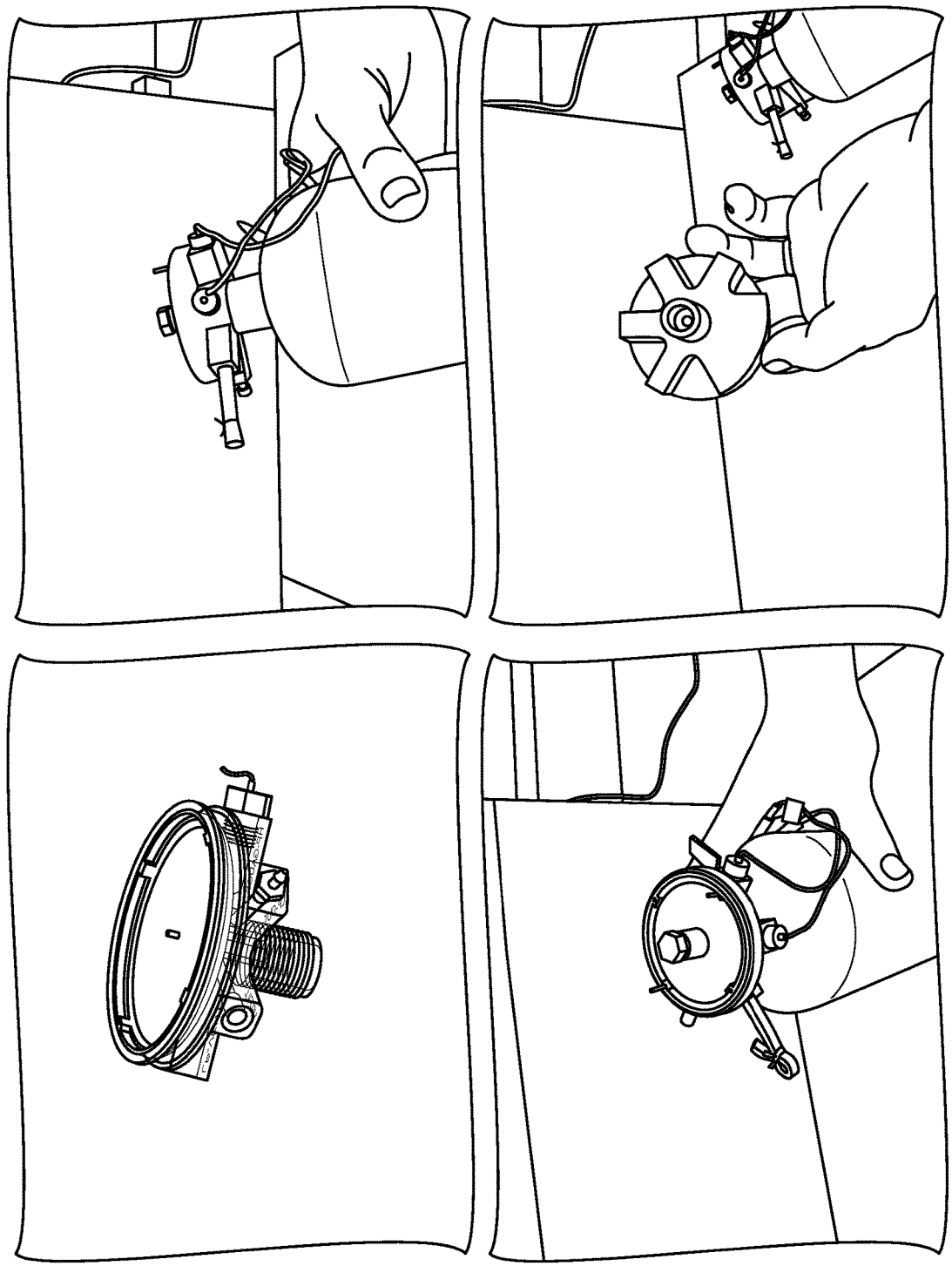
FIG. 2 shows a schematic of a single stage regulator, plus photos of how it is incorporated onto a hydrogen tank and with electronics.
Figure 3B:
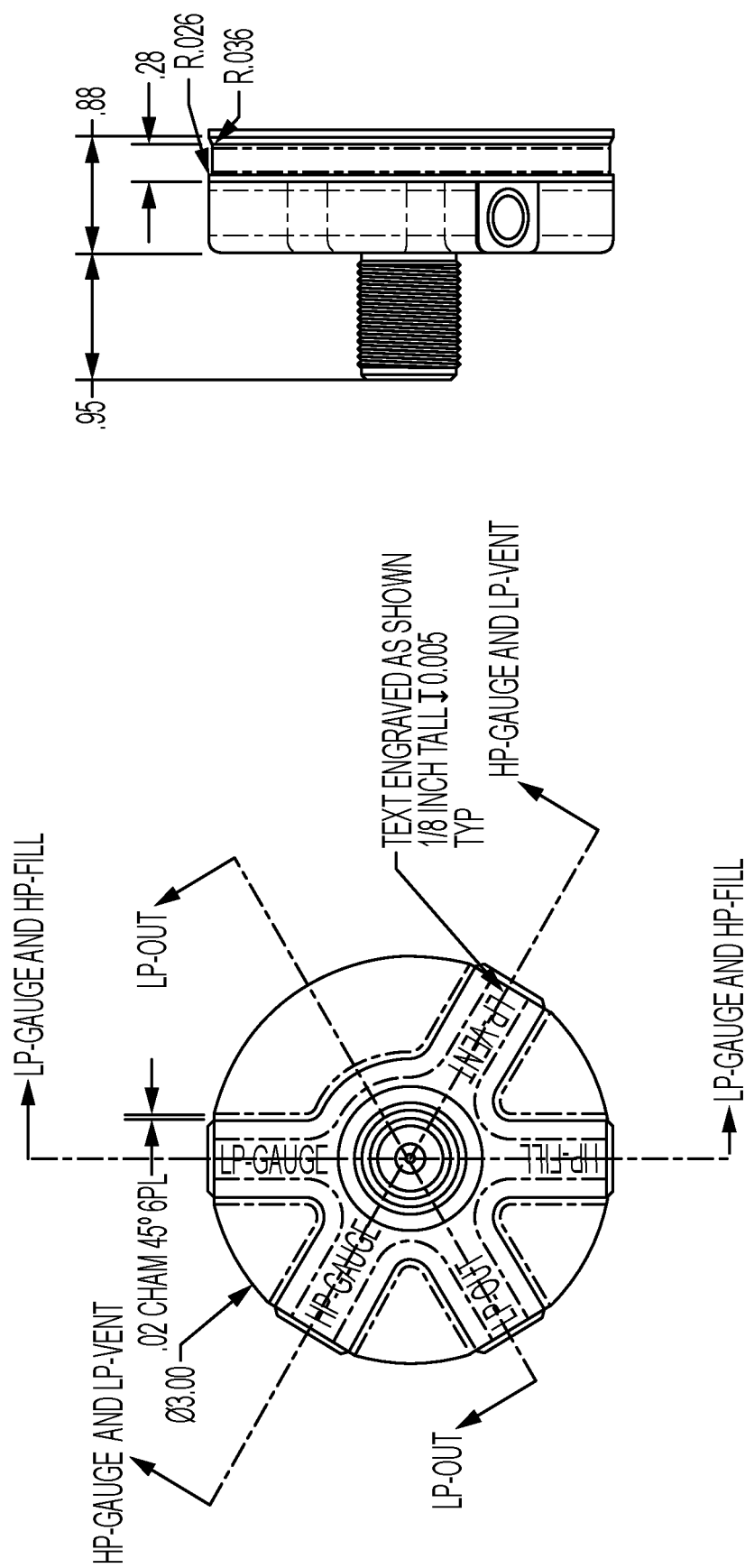
Figure 4A:
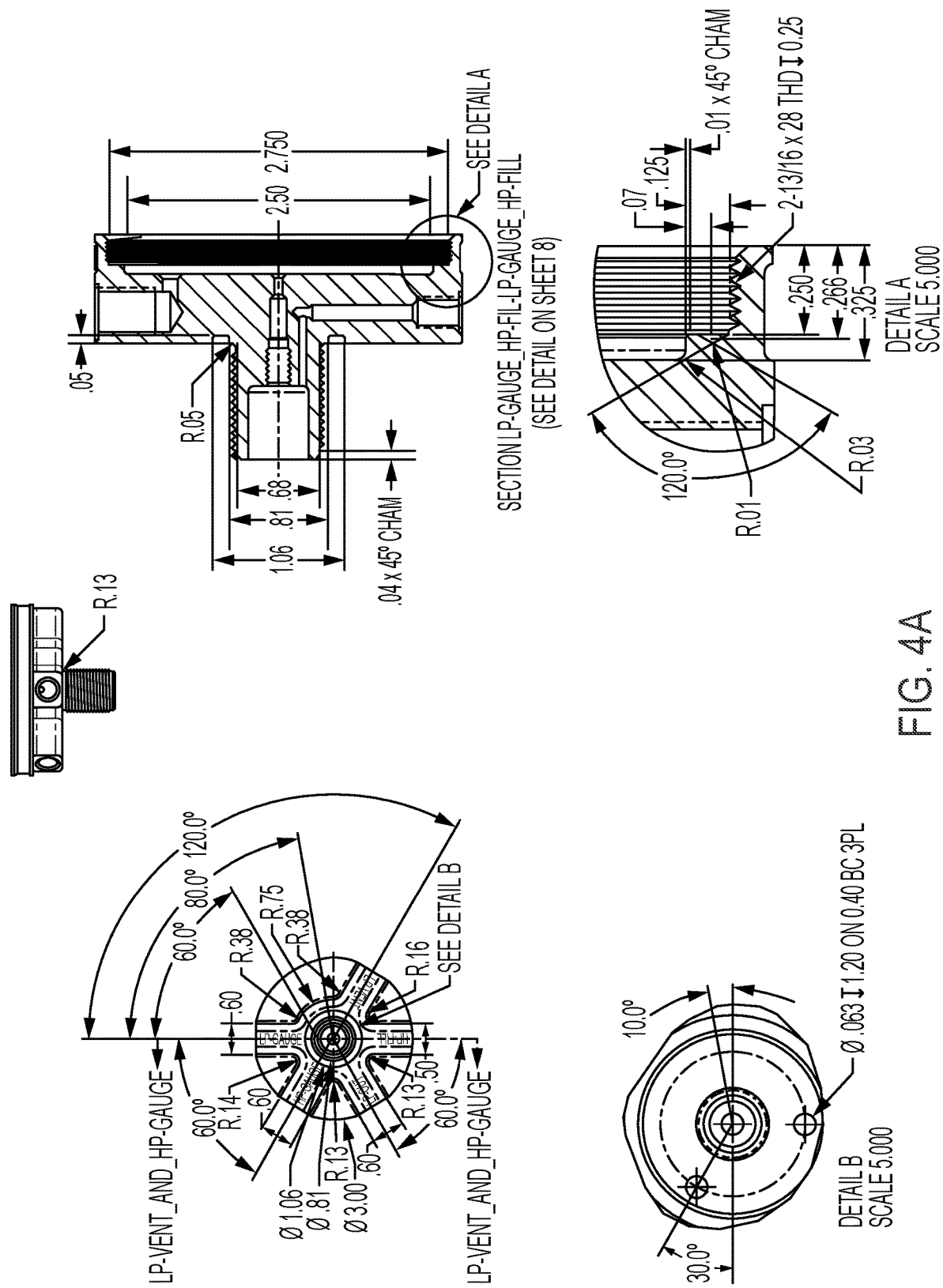
Figure 5:
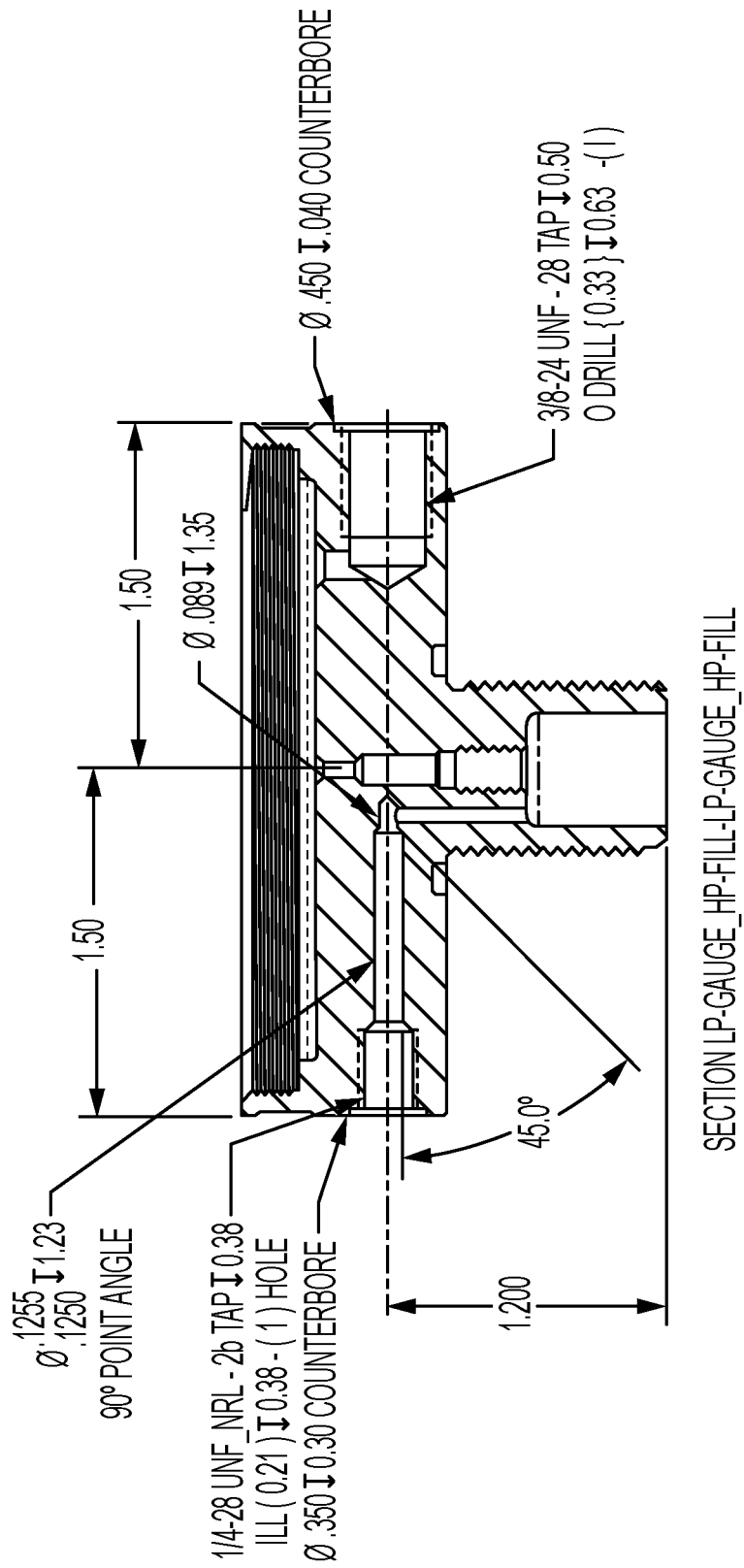
Figure 6:
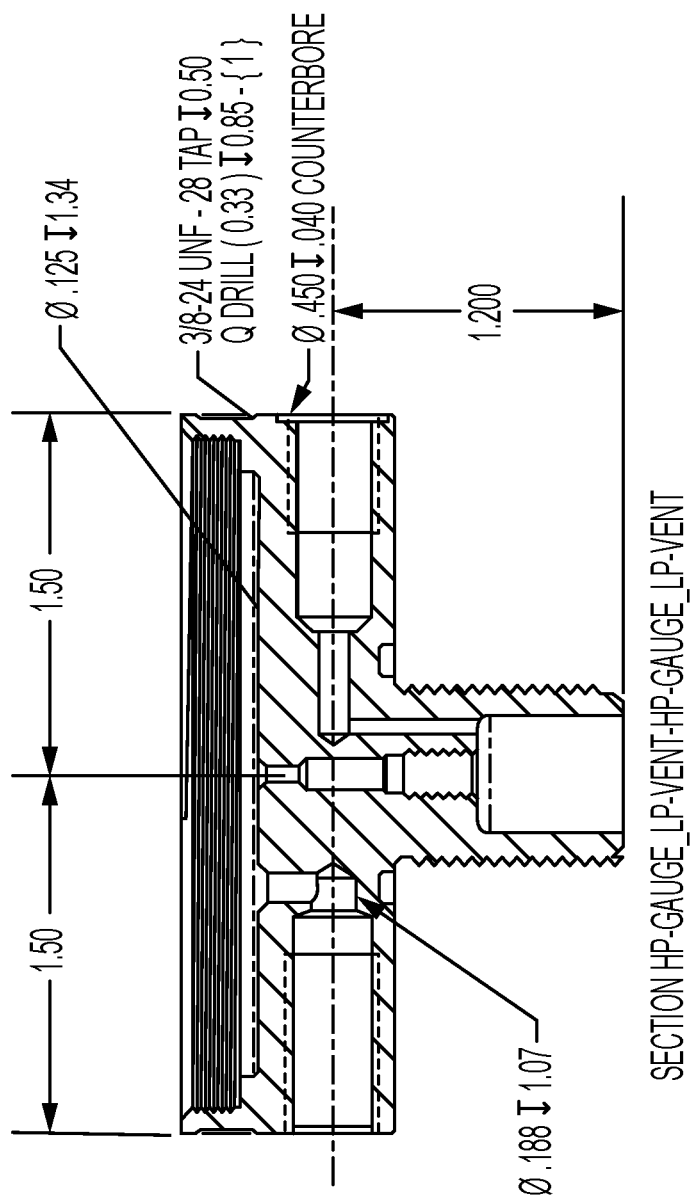
Figure 7:
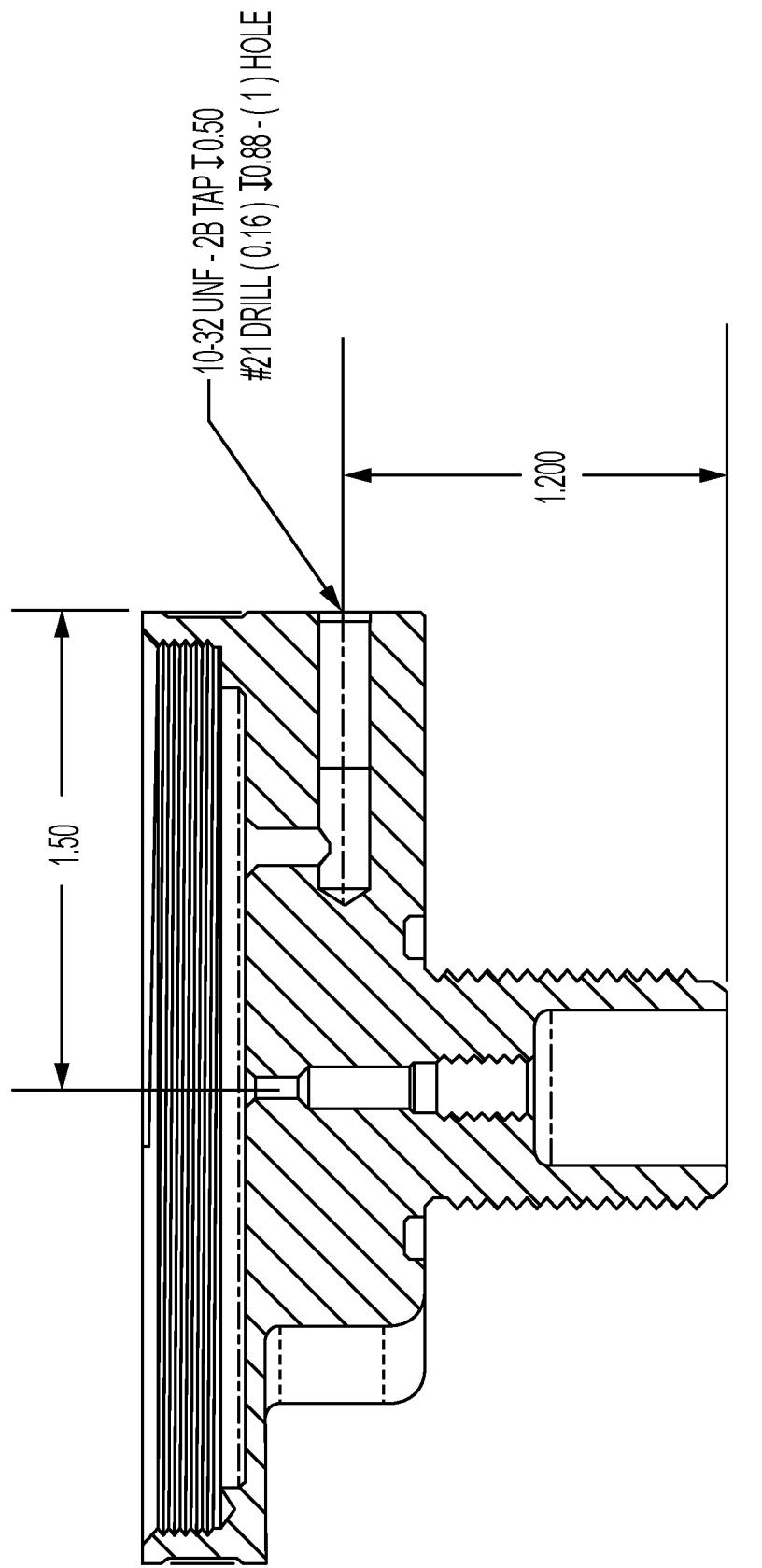
Figure 8:
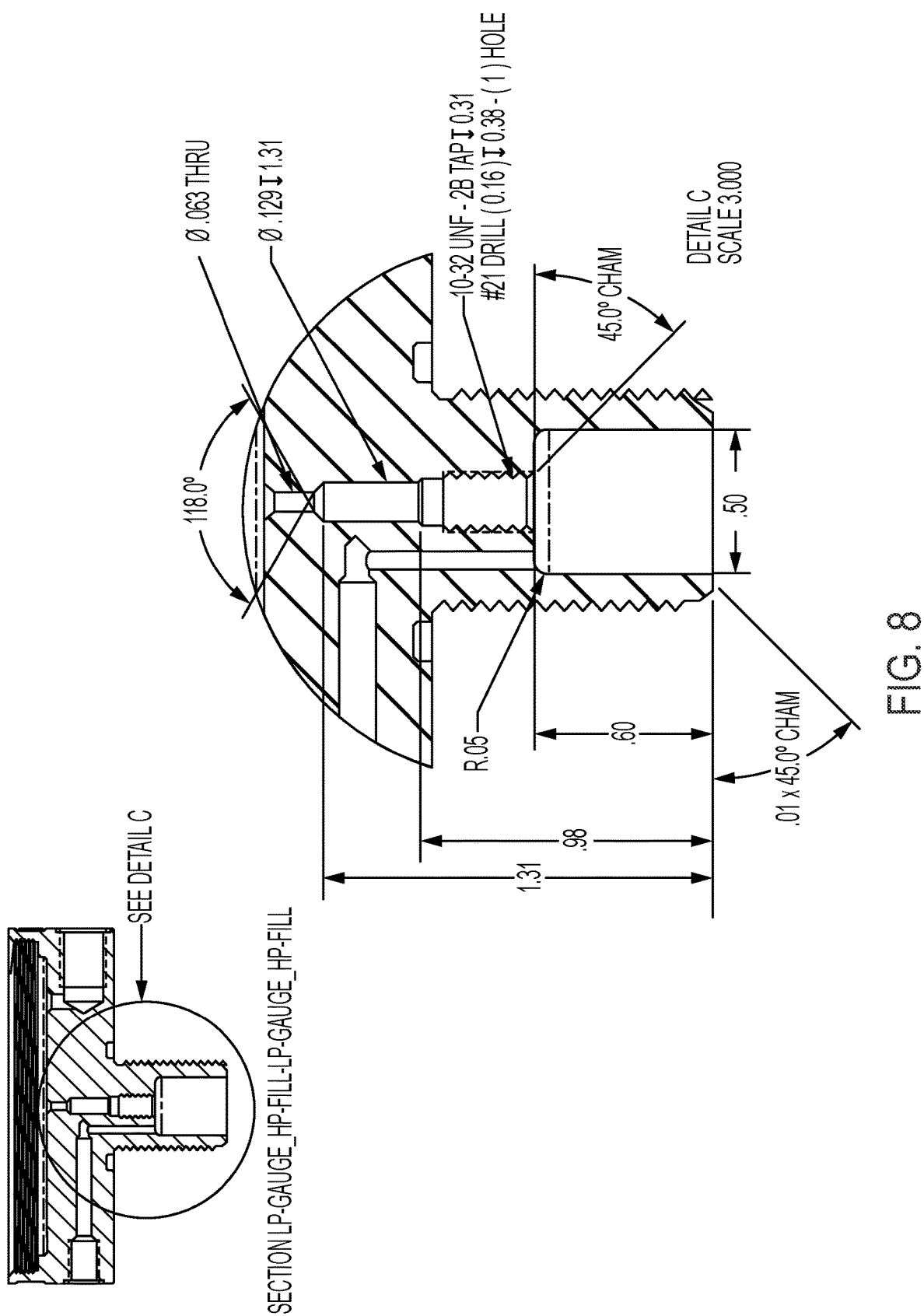

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a practical implementation of a hydrogen-fueled polymer fuel cell system for unmanned systems. Specifically, we describe a fuel cell to produce power for propulsion, avionic and payload power onboard a small (25 to 5000 W) unmanned air vehicle (UAV). The electric power, low temperature and low noise of the fuel cell ensures that the vehicles have a low signature and are thus difficult to detect, even when flying at low altitudes.

UAVs have stringent weight requirements. An aspect of the system is that the practical weight, or range of weight, of each component of the fuel cell UAV system is described for long endurance and high performance. The system described herein may ensure that a UAV can be flown in tactical conditions, e.g., fly in persistent and strong head or tail winds, climb for extended periods, high temperatures, high altitudes, with an autopilot and appreciable payload.

The weight of the propulsion plant for a UAV should be on the order of 35- to 55-wt % of the gross take off weight (GTOW) of the vehicle. (see: Uninhabited Air Vehicles: Enabling Science for Military Systems, National Academy Press, 2000). Less weight can be used, usually at the expense of fuel, and more weight can be used, usually at the expense of a payload. (see: "*The emergence of mini UAVs for military applications*" *Montgomery and Coffey, Defense Horizons, December* 2002).

The specifications disclosed herein can allow for the use of the system in a UAV. The components may be produced and assembled as described herein and by methods known in the arts of fuel cells and UAVs.

NRL has recently demonstrated the practical utility of fuel cell systems for powering unmanned systems with the Ion Tiger system. The 16-kg Ion Tiger flew for 26-hours on a fuel cell propulsion plant weighing a total of 7 kg. The fuel cell propulsion plant consisted of a 550-W polymer (proton exchange membrane) fuel cell system, an internal fin and tube radiator, a carbon-overwrapped aluminum pressure vessel holding 500 g of hydrogen gas at 5000 psi, a single stage regulator, and electronics to communicate with an autopilot, ground station and payload. The vehicle also carried a 5-lb payload.

The system described herein includes a proton exchange membrane fuel cell, a heat exchange unit, a single stage regulator, a hydrogen tank, and control electronics suited for flying in an air vehicle with a high aspect wing ratio and an appreciable payload using an autopilot. The hydrogen tank is either a carbon-overwrapped aluminum pressure vessel for containing compressed hydrogen, or an insulated low-pressure tank for containing cryogenic hydrogen. This is the first known reduction to practice of a fuel cell for a tactical 25 to 5000 W unmanned air vehicles. The innovation was to design a complete system with lightweight high performance parts to meet the overall needs of small tactical unmanned air vehicles. The system also enables the fuel cell to communicate with an autopilot and ground control station.

Specifics of an example system are described below.

System Schematic

A system schematic of the Ion Tiger system is shown in FIGS. 1A-D. Hydrogen gas is fed to a fuel cell system via a fuel tank (comprising a single stage regulator and carbon overwrapped pressure vessel). The amount of hydrogen delivered is controlled by a pressure signal. The fuel cell converts the oxygen in air and hydrogen fuel into electricity, heat and water. The electricity is fed to the fuel cell balance of plant (air pumps, coolant pumps, etc), avionics (servos, autopilot), payload, and electric motor. A backup battery is used for the autopilot, and is continuously charged. It might also be integrated to provide some additional power to the motor. The heat is rejected through a fin and tube radiator. The heat rejection is controlled to keep the fuel cell temperature between about 40 and 70° C. For higher temperatures, a fan is used to provide additional air flow. A bypass valve controls the lower limit of the heat rejection. The radiator contains a debubbler to prevent air bubbles from accumulating in the radiator. Full details are described below under System Specifications.

Air Vehicle Design

An example of the weight allocations of a fuel cell UAV system design is given below in Table 1. The vehicle weighs approximately 35 lbs. In this case, the fuel cell system weighs 13.2 lbs, and incorporates the fuel cell system (stack, air blower, humidifier, etc.), fuel tank, fuel, regulator, and cooling system. Additional electronics might also be required. The vehicle cruises at 267 W. At least 2× the cruise power (~550 W total power) is needed for take off, climb and maneuvering, making this a 500 to 600 W (minimum) vehicle. Higher power is desirable, as it will enable faster dash, climb, and persistence in strong headwinds. The weight allocations for a 19-lb fuel cell UAV flown with a 550 W fuel cell is given in Table 2. The main difference between the 35- and 19-lb systems is the amount of hydrogen fuel carried, which impacts the weight and size of the fuel tank and thus the vehicle size and weight. The larger the fuel tank, the longer the endurance. For the 35-lb vehicle, the target storage is 13% hydrogen by weight (of the tank and regulator) for a 22-L hydrogen tank carrying 500 g of $H_2$ fuel at 5000 psi. It is on the order of 4% for the smaller vehicle carrying a 1.9 liter tank with only about 43 g of compressed $H_2$.

Table 1: Approximate Weight Allocations for ~35 lb, 550-W Vehicle

TABLE 1

Approximate weight allocations for ~35 lb, 550-W vehicle

| GTOW | 35.5 lbs |
|---|---|
| Fuel cell | 2.2 lbs |
| Fuel tank (22-L H2 tank) | 8.0 lbs |
| Fuel | 1.1 lbs |
| Regulator | 0.4 lbs |
| Cooling system | 1.5 lbs |
| Propulsion system | 0.9 lbs |
| Avionics | 1.0 lbs |
| Airframe (with internal mounts, wiring, etc. | 15.5 lbs |
| Payload | 5.0 lbs |
| Dimensions | |
| Wing area | 16.9 ft² |
| Span | 17.0 ft |
| Aspect ratio | 17 |
| Length | 7.9 ft |
| L/D | 17 |
| Cruise power | 267 W |
| Propulsion | 200 W |
| Avionics | 20 W |
| Flight controls | 20 W |
| Payload | 20 W |
| Conversion losses | 7 W |

Table 2: Weight Allocations for a 19-lb Fuel Cell UAV Flown with a 550 W Fuel Cell Using Two Different Sized Hydrogen Tanks

TABLE 2

Weight allocations for a 19-lb fuel cell UAV flown with a 550 W fuel cell using two different sized hydrogen tanks

| Component | Total weight (lbs) |
|---|---|
| Total weight - 1.9 L H2 tank | 18.7 lbs |
| Total weight - 4 L H2 tank | 19.3 lbs |
| Wing and fuselage group | 8.8 |
| Propulsion group | |
| Fuel cell - complete | 2.71 |
| Radiator | 0.84 |
| Fuel/fuel tank - 1.9 L H2 tank option | 1.81 |
| Fuel/fuel tank - 4 L H2 tank option | 2.39 |
| Regulator | 0.48 |
| Motor/gearbox/ propel ler | 0.59 |
| Avionics group (including servos and autopilot) | 0.766 |

TABLE 2-continued

Weight allocations for a 19-lb fuel cell UAV flown with a 550 W fuel cell using two different sized hydrogen tanks

| Component | Total weight (lbs) |
|---|---|
| Payload group (camera) | 1.98 |
| Miscellaneous group (wiring, back up battery) | 0.764 |

Fuel Cell System

The fuel cell system is shown in section 2 of the schematic in FIGS. 1A-D. It includes a fuel cell stack, control electronics, and air blowers, humidifiers, coolant pumps, and the total system must have a specific power of at least 200 W/kg but preferably greater than 275 W/kg. The performance specifications are summarized below for a 550 W system:
Weight (total system as defined above): 2 kg
Maximum continuous power: 550 W
Minimum continuous power: 50 W
Operating temperature range (minimum) 0 to 45° C.
Efficiency>35% (higher heating value of hydrogen)

Higher power-to-weight ratios are expected for larger systems. It is desirable that the system be able to operate continuously at as low a setting of 5 to 10% of its maximum power to continuously at its maximum power. A wide range of power capability also enables modular payloads with varying power loads.

Hybridization with a battery is not necessary, although some use of a battery might be implemented load leveling, if the stack is frequently shorted to rejuvenate the cathode catalysts, which is customary for fuel cell operation. The fuel cell can also be used to charge a backup battery.

The fuel cell system has been reduced to practice with a perfluorosulfonic (PFSA)-acid membrane proton exchange membrane fuel cell, but might also comprise other types of polymers.

Single Stage Regulator

The regulator is shown in Sections 4.2 and 4.3 in the schematic in FIGS. 1A-D. It is designed to meet the following criteria:
Small and lightweight
Deliver approximately 0.06 to 0.08 g/hr/$W_{fuel\ cell\ output}$ at 4-30 psi, from a tank with hydrogen gas compressed to 5000 psi and optionally up to 10,000 psi.
Report the high and low side pressure to the ground at regular intervals
Have a fill port with quick disconnect
Have a low pressure safety relief valve settable to 30 psi to prevent fuel cell damage
Have a high pressure safety relief valve settable to the maximum pressure of the $H_2$ tank to prevent the tank from approaching the burst pressure
Have an on/off valve to prevent $H_2$ leaking from the tank during storage The regulator operates in a single stage to conserve weight. It contains an inlet and outlet valve for gas, and a pressure sensor and electronics for monitoring the gas pressure. It contains a titanium burst disk. The regulator and electronic control board weigh 0.15 kg. Drawings for the regulator are given in FIGS. 3A-B, 4A-B, and 5-8.

The main diaphragm of the regulator serves two purposes: it is both the return spring and the diaphragm. The diaphragm material is 0.025 inch thick titanium, which gives an outlet pressure of 17-20 psi with a tank at 5000 psi. The diaphragm diameter and thickness were determined through a finite element stress analysis using Pro/Mechanica software. Accurately predicting the total displacement and stress on the diaphragm was critical to success of the regulator. For a different pressure range, a different sized diaphragm would be used.

The second area of interest is the pintle seal. Reducing the throat area to a small (0.063 inch) diameter to minimize the pressure rise dictated resulted in a 0.058 inch diameter (0-80) adjustment screw. Even with this fine thread, a quarter turn produced several psi change at the outlet. Therefore, seal material compliance and surface finish of the seat is extremely critical. The final design uses nylon that was machined in place on the pintle so that it would be as nearly concentric with the pintle as possible. It was also designed with as much thread engagement as possible so that it would not cold flow up the pintle screw under the 5000 psi operating pressure. The present design has held a constant static output pressure under 5000 psi over several weeks.

High and low side pressure sensors were included in the hydrogen pressure regulator to enable operators to estimate the amount of fuel remaining in the tank and determine whether or not the pressure regulator was working properly. Two pressure transducers were set in threaded ports on the regulator, exposed to the tank pressure and regulator outlet pressure. A small electronics board (designed by NRL) provided the transducers with power and read the pressure signals from them. The board passed the data to the fuel cell electronics in RS-232 format. A small battery-powered box was built to read data from the regulator when it was not installed in the airplane.

This pressure sensing arrangement was useful not only for flight testing, but for a variety of tasks on the ground including filling the hydrogen tanks and troubleshooting problems with the regulator when it was in development.

Fuel Tank—Compressed Hydrogen

A hydrogen tank capable of storing 500 g of high-pressure hydrogen should weigh no more than 7 kg. Ideally, it will weigh less than 4 kg. This device is shown in section 4.1 of the schematic in FIGS. 1A-D. Two methods are given for making the compressed hydrogen tanks capable of storing hydrogen at 5000 psi.
1. Chemically etch aluminum liner, and then overwrap with carbon fiber.
2. Metal spin 2219 aluminum. Weld together parts. Overwrap with carbon fiber.

Integrated Fuel Tank and Regulator

A one time use high pressure fuel tank for PEM fuel cell UAVs with integral burst disk and single stage regulator having a two piece welded aluminum alloy liner with a carbon fiber overwrap for supplying low pressure hydrogen gas on demand may be used. This device would be in Section 4.1 and 4.2 of the schematic in FIGS. 1A-D.

Disclosed herein is the design of the Carbon Overwrapped Pressure Vessel or COPV, a high pressure, (3,000-10,000 psi) hydrogen fuel tank used to store hydrogen to power these aircraft. The preferred working pressure of this design is 5,000 psi due to the trade oft between hydrogen storage, volume and weight of the tank, however, higher or lower operating pressures can be used.

Proton exchange membrane (PEM) fuel cells operate with an inlet pressure of between 7 and 200 psi. Inlet pressure must remain constant to plus or minus five psi during the flight even though the demand is fluctuating due to power demand. Due to fuel usage, pressure in the tank goes from 5,000 psi down to 7 psi during the mission but the low pressure side must not rise above 25 psi as to not damage the membranes of the fuel cell or fall below 7 psi so that the fuel cell will not be starved of fuel. It is also critical that the tank is full at the start of the mission which could be weeks or months after filling and it is desirable to be able use all of the gas to maximize fuel utilization.

Due to the desire to achieve a high power to weight ratio for aircraft propulsion systems, weight is an extremely important factor in the design of a successful fuel cell aircraft. Therefore, as the fuel storage is a significant factor in the weight fraction of an aircraft, a light and strong tank is critical to performance. Several embodiments have been tested and flown however; the figures shown below are the preferred embodiment for the system.

COPVs for hydrogen containment were chosen as the closest available technology and have been adapted for use as fuel storage tanks for UAVs with changes shown below to improve the storage to weight fraction and utility towards UAVs use in tactical situations.

Previous liners used for COPVs were constructed from 6061-T6 aluminum and were formed using an extrusion and forming process that resulted in a heavy walled liner that could be wound with low strength carbon or fiberglass to form a high pressure tank of relatively low cost to weight with a DOT safety factor of greater than three to one. Initial experiments were done using these tanks however it was found that the aircraft was overweight using these commercially available tanks. In order to improve the gas storage to weight ratio of the tanks for aircraft use several changes were made to the standard tank. First the liners were chemically etched to reduce their weight by 60%. Secondly the normal fiber was replaced with high strength aerospace fiber with higher strength fibers, (300,000 psi). Thirdly the safety factor was reduced to 1.5, typical for aeronautical applications, instead of the 3.2 used by DOT. Fourth, high strength carbon nanotubes were mixed in with the resin to increase the strength of the epoxy used in the overwrap.

The previous improvements and adaptations led to the present system to further improve the storage to weight fraction of the fuel delivery system. Incorporating the burst disk into tank liner, incorporation of the regulator body into the liner improves the weight fraction of the system. It also removes the need for pyrotechnics near the fuel.

Figure 9:
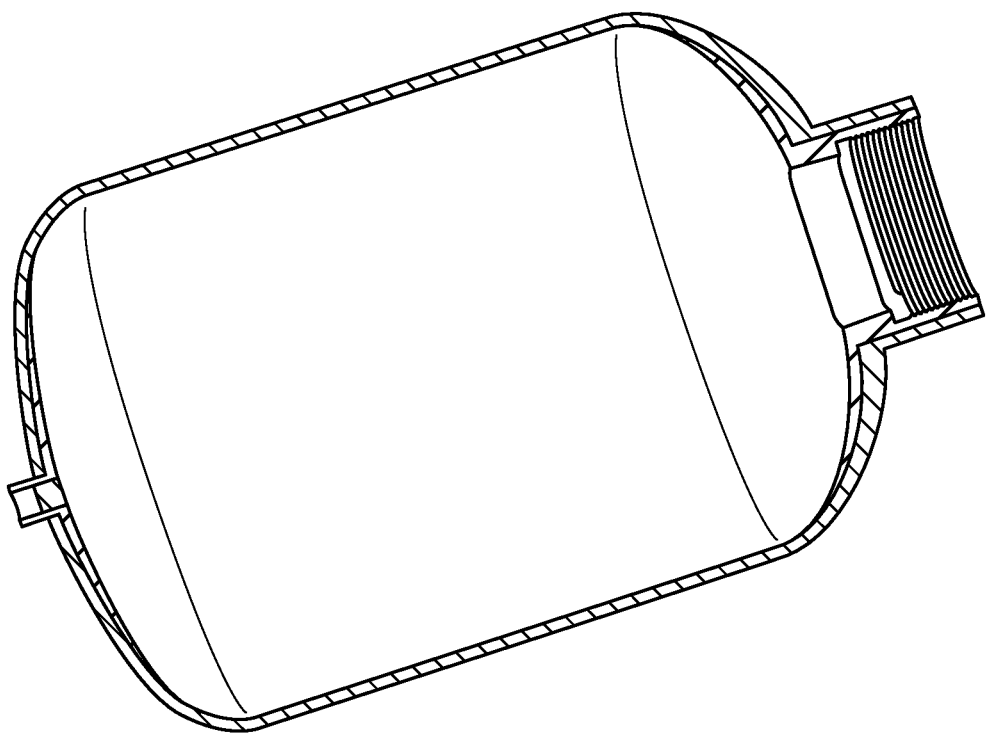
FIG. 9 shows a first cross-section of the fuel tank.
Figure 10:
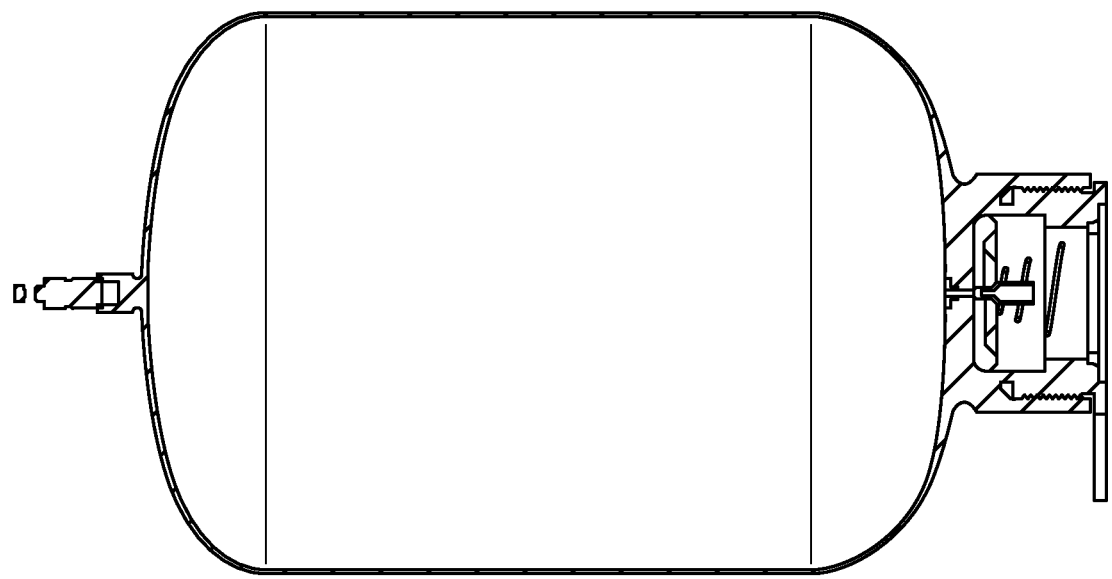
FIG. 10 shows a second cross-section of the fuel tank.

FIG. 9 shows a first cross-section of the fuel tank. The carbon overwrap is shown in black and the aluminum 2219 alloy is shown in gray. In FIG. 10 the carbon has been removed for clarity. The regulator and burst disk assembly can be seen at the right side of the image. It is shown in its stow position which is supporting the burst disk area of the liner. On the left side of the image is the fill valve. This is used for filling the tank to high pressure after purging and is then permanently sealed using a crimp seal.

Figure 11:
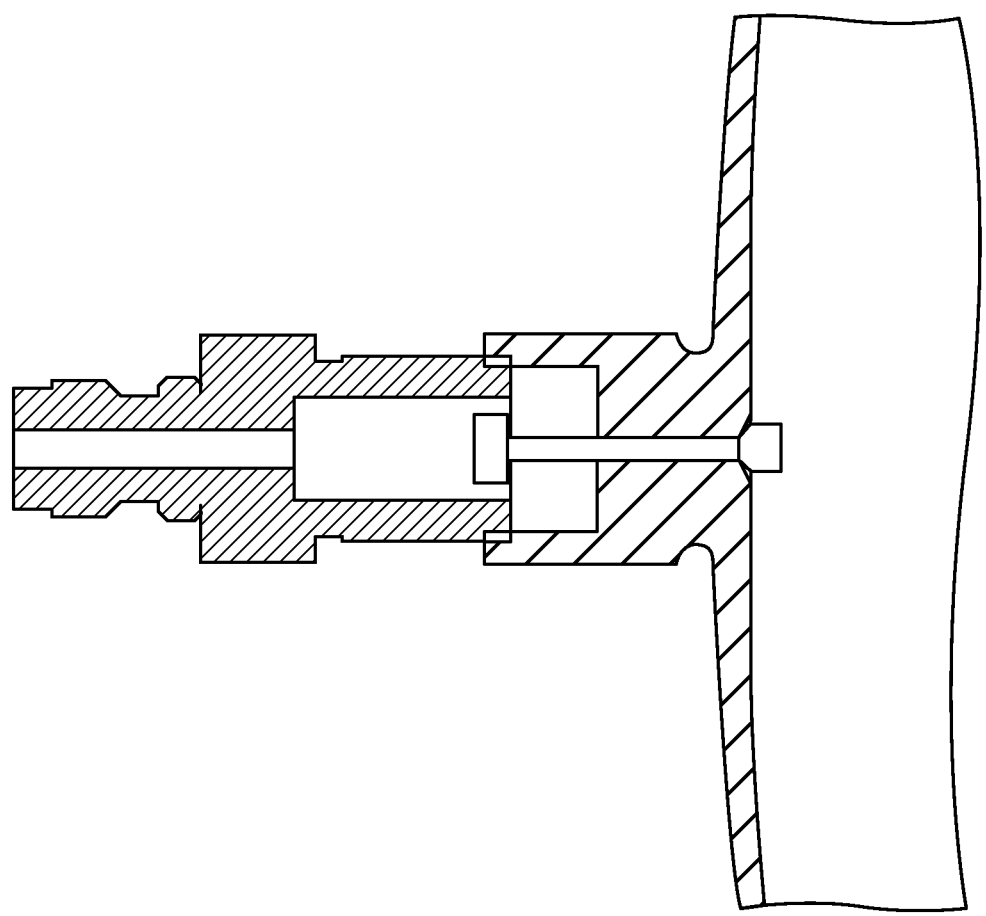
FIG. 11 shows a third cross-section of the fuel tank.

FIG. 11 is a detail of the fill valve and is shown with the high pressure connector in place holding the pintle in the fill position. Once the fill connector is removed, a small spring (not shown) temporally shuts off the flow of gas from the tank. A crimp seal is installed in the fitting and permanently seals the tank.

Figure 12:
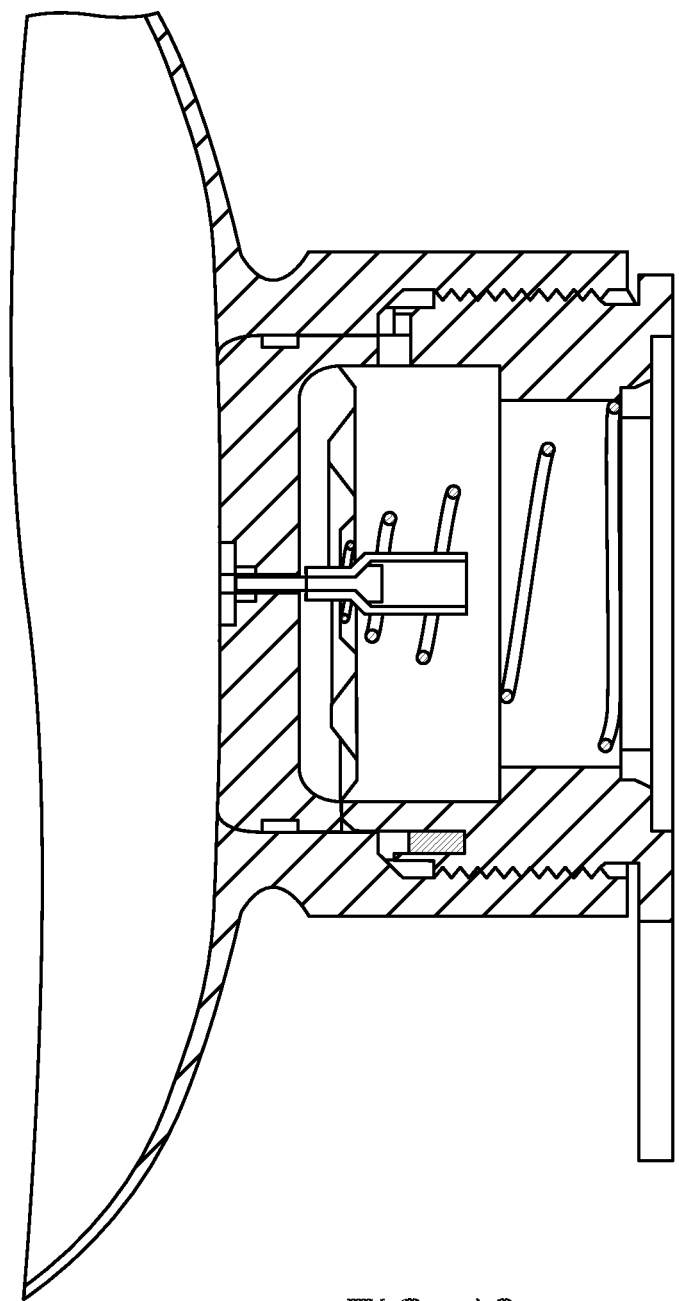
FIG. 12 shows a fourth cross-section of the fuel tank.

FIG. 12 shows a detail of the regulator and burst disk assembly. The regulator is shown in the stowed position. The burst disk is fully supported by the regulator assembly. To begin operation the regulator must first move away from the burst disk, causing it to rupture, allowing gas to flow into the regulator. The regulator body is moved by turning the lever. Not shown is a second method of allowing the regulator to move, a coil of wire which is pulled out allowing the regulator assembly to move away from the burst disk causing rupture and gas flow around the pintle and into the chamber under the diaphragm. Gas then flows through the nozzle and on to the Fuel cell through a flexible tube (not shown). Once pressure has increased to the set level the pintle closes due to the action of the diaphragm once demand has bled off the pressure the spring and diaphragm reopens the pintle until the demand is satisfied again.

Fuel Tank—Cryogenic Hydrogen

A hydrogen tank capable of storing 1500 g of hydrogen should weigh no more than 7 kg. Ideally, it will weigh less than 4 kg. This system would occupy section 4 of the schematic in FIGS. 1A-D. An example of system specifications for the 35-lb, 550-W air vehicle in Table 1 follows:
Must be capable of containing 1500 g of hydrogen
Dry mass of the storage system must be less than 3.6 kg
The diameter of the system must be less than 32 cm. There is flexibility with the length metric.
Gaseous hydrogen must be delivered to the fuel cell at a pressure of 4 to 10 psi.
The temperature of the hydrogen must be below 50° C.
Mission length is 72 hours
Average hydrogen flow 21.5 g/hr, with a maximum of 45 g/hr and a minimum of 3 g/hr.
Hydrogen flow must be able to increase from 3 to 45 g/hr no more than 10 sec, with a target of 2 sec. Increase from 21.5 to 45 g/hr in less than 5 sec with a goal of 1 sec.
The insulation can be made with multi-layer insulation (e.g., MLI).

Cooling System

Figure 13:
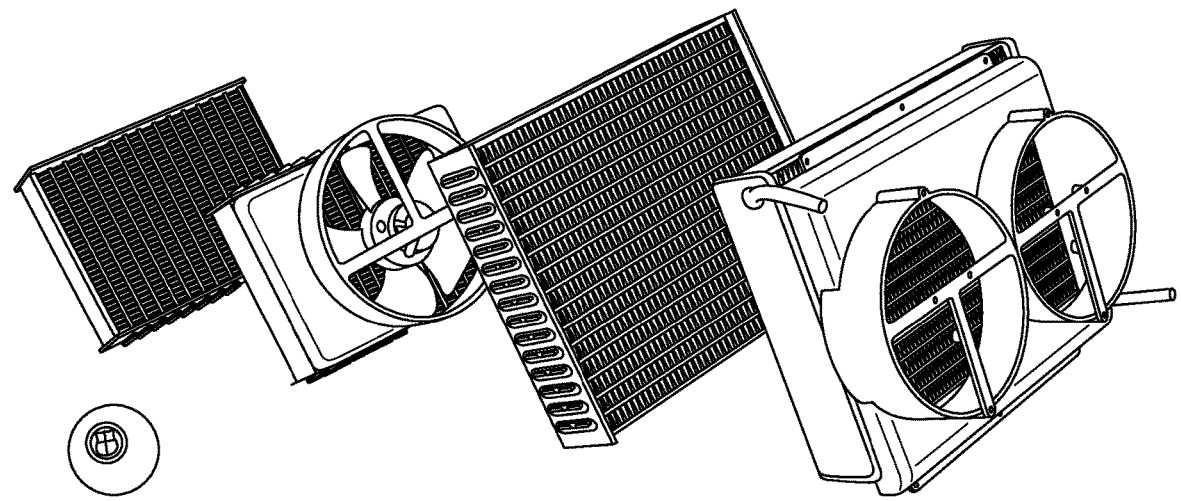
FIG. 13 shows various lightweight fin and tube radiators shown with lightweight fans and coolant reservoir.

The cooling system used in the examples in Tables 1 and 2 consists of a tube and fin heat exchanger and fan(s). See section 6.3 of the schematic in FIGS. 1A-D. Custom lightweight end tanks and fittings were added to reduce the weigh to the heat exchanger, and high efficiency brushless motors were used to drive the fans. The heat exchanger has an overall heat transfer coefficient given by $U_{rad}(v_{air})=1269 v_{air}+99.9$ W/(m²° C.) in which the average air velocity through the heat exchanger $v_{air}$ is measured in m/s. This correlation is valid for average air velocities up to ~6 m/s. The ratio of airflow cross-section area to mass is 1.97 g/cm², making the heat exchanger quite efficient in terms of heat transfer per unit mass. Coolant side pressure drop through the heat exchanger is less than 1 lb/in² for water flow rates between 0 and 2 L/min. Photos of representative radiators are shown in FIGS. 13.

A 5 to 20% increase in radiator efficiency can be gained by evaporative cooling, by which any product water from the fuel cell is dispensed onto the radiator, where it evaporates and provides additional cooling.

Alternative concepts for radiators include a radiator built directly into the fuel cell.

Electronics

The electronics that control the fuel cell must be capable of communicating with an autopilot and ground control station. See sections 3.3, 5.1 and 5.2 in FIGS. 1A-D. The electronics have already been discussed in the publication Stroman et al., "Development and Integration of Controls for a PEMFC Powered Aircraft," *ECS Transactions,* 11(1), 1493-1504 (Oct. 7-12, 2007, Wash., DC).

System Specifications

Configuration

The following describes the base Ion Tiger configuration for 26 hr endurance flight in November 2009, and provides the details for vehicle in Table 1. It is revision 3.5 of the "Ion Tiger Specifications and Interface Control Document".

Notes

Masses are in kg, followed by pounds in parentheses: kg (pounds).

Nodes on the system schematic refer to lines in this document and vice versa.

Approximate numbers are preceded by a tilde~.

1 Overall Vehicle 1.1 Flight endurance estimate: ~24 hr 1.2 Cruise speed: 25-29 knots 1.3 Vehicle weight breakdown by subsystem and component:

2.1.4 The complete FC system is mounted on a tray, which makes it a monolithic subassembly that can be installed/removed from the aircraft as a whole.

2.2 Fuel cell subsystem power interfaces 2.2.1 The FC system provides power to a 12 VDC bus which supplies power to the following components, all of which are connected in parallel. The 12 VDC rail should allow for the following minimum power, plus provide additional power for 12 VCD payloads.

| 12 VDC Power Consumer | Nominal Current [A] | Maximum Current [A] | Nominal Power [W] | Maximum Power [W] |
|---|---|---|---|---|
| 2.4.1.1 Autopilot (from Piccolo II spec, sheet) | 0.33 | 0.33 | 4 | 4 |
| 2.4.1.2 Payload (from SpearNet spec, sheet) | 0.42 | 0.42 | 5 | 5 |
| 2.4.1.4 Radiator fan (measured) | 0.75 | 1.50 | 9 | 18 |
| 2.4.1.5 Total | 1.70 | 2.55 | 21 | 27 |

|  | Compnt. Mass | | Subsystem Mass | |
|---|---|---|---|---|
|  | kg | (1b) | kg | (1b) |
| 1.3.1 FC System Total (wet) |  |  | 1.23 | (2.71) |
| 1.3.1 Fuel Storage System Total |  |  | 4.979 | (10.98) |
| 1.3.1.1 Fuel tank (etched aluminum liner) | 4.327 | (9.540) |  |  |
| 1.3.1.2 High pressure $H_2$ regulator and electronics board | 0.152 | (0.335) |  |  |
| 1.3.1.3 Hydrogen fuel (22 L @ 5000 psi, $25^O C$) | 0.500 | (1.102) |  |  |
| 1.3.2 Avionics/Autopilot/Payload Total |  |  | 2.267 | (5.00) |
| 1.3.2.1 Avionics (servos, etc.) | 0.221 | (0.488) |  |  |
| 1.3.2.2 Autopilot (Piccolo II) | 0.233 | (0.514) |  |  |
| 1.3.2.3 Payload (SpcarNet Radio) | 0.390 | (0.860) |  |  |
| 1.3.2.4 Transponder (MicroAir T2000UAV-L) | 0.454 | (1.000) |  |  |
| 1.3.2.5 Ballast (to make §1.3.3.3 + §1.3.3.4 = 4 lb payload) | 0.970 | (2.140) |  |  |
| 1.3.3 Air Vehicle Total |  |  | 9.52 | (21.00) |
| 1.3.3.1 Propulsion motor and propeller (Neu) | 0.230 | (0.507) |  |  |
| 1.3.3.2 Propulsion motor controller (HV45) | 0.035 | (0.077) |  |  |
| 1.3.3.3 Radiator (including coolant, fan, fan motor & controller) | 0.733 | (1.616) |  |  |
| 1.3.3.4 Startup Battery (A 123, 4 cell pack) | 0.280 | (0.617) |  |  |
| 1.3.3.5 Airframe | 7.03 | (15.5) |  |  |
| 1.3.3.6 Coolant not in the fuel cell or radiator | 0.032 | (0.071) |  |  |
| 1.3.3.7 Miscellaneous (tubing, wires, etc.) | 1.18 | (2.61) |  |  |
| 1.3.4 TOGW |  |  | 18.00 | (39.69) |

2 Fuel Cell System 2.1 Whole subsystem specifications 2.1.1 Net electrical efficiency of the FC system @ cruise power 2.1.2 FC system net electrical power output (sum of high power, 5 VDC and 12 VDC outputs): ≥550 W 2.1.3 FC system high power output voltage range: 20-36 V 2.4.1.6 Maximum output of the DC-DC converter feeding the 12 VDC bus: 80 W.

2.4.1.7 Target voltage for the 12 VDC bus is 14.4 VDC in order to charge the startup/backup battery, which is nominally at 13.2 VDC.

2.2.2 The FC system provides power to a 5 VDC bus which supplies power to the following components, all of which are connected in parallel:

| 5 VDC Power Consumer | Nominal Current [A] | Maximum Current [A] | Nominal Power [W] | Maximum Power [W] |
|---|---|---|---|---|
| 2.4.2.1 Servos (via the autopilot) (estimate) | 2.60 | 9.00 | 13 | 45 |
| 2.4.2.2 Propulsion motor controller (estimate) | small | small | small | small |
| 2.4.2.3 H$_2$ pressure sensors (measured) | 0.03 | 0.03 | 0.4 | 0.4 |
| 2.4.2.4 Hall Effect propulsion motor RPM sensor | small | small | small | small |
| 2.4.2.5 Total | 2.63 | 9.03 | 13 | 45 |

2.4.2.6 Maximum power output of the DC-DC converter feeding the 5 VDC bus: 50 W.

2.2.3 The FC system provides power to the propulsion motor controller: 0-27 A @ 20-36 V 2.2.4 The FC electronics are connected to a startup/backup battery via an Anderson power pole connector. The connector colors are red and black.

2.2.4.1 The startup/backup battery is connected to and disconnected from the system by an Anderson power pole connector; no switch is necessary. The connector colors are yellow and green.

2.2.4.2 The battery supports the 12 VDC and 5 VDC loads whenever the 12 VDC bus falls below the battery voltage. A diode prevents current from flowing from the battery to the fuel cell stack when the stack voltage is below the battery voltage.

2.2.4.3 The FC electronics charge the startup/backup battery whenever the 12 VDC bus voltage is higher than the battery voltage. The nominal battery state is fully charged.

2.2.4.4 The FC electronics attempt to keep the battery resting voltage at 13.8 V.

2.2.5 The radiator is grounded to the FC system tray by a wire with ring terminals at each end. Screws pass through the ring terminals and are threaded into tapped holes in the FC system tray and radiator. This ground strap is intended to prevent the build up of charge on the radiator due to the conductive coolant, which is in contact with both the radiator and bipolar plates in the FC stack.

2.3 Balance of plant components for fuel cell 2.7 Software Interface 2.7.1 Software is used to communicate with the FC system.

2.8 Physical Interfaces for Electronics

| Pin Assignments for the 44-pin D-sub connector on the FC electronics board |||
|---|---|---|
| Pin Number(s) | Pin Assignment | Node |
| 44-32 | Power ground | |
| 31 | No connection (formerly signal ground) | |
| 30 | Signal ground for interlock switch | |
| 29 | Propulsion motor controller throttle signal | 2.3.4 |
| 28 | No connection (formerly signal ground) | |
| 27 | Radiator fan motor controller throttle signal | 2.3.7 |
| 26 | +5 VDC (power to servos) | 2.4.2 |
| 25 | RS-232 transmit to H, pressure regulator signal board from FC electronics | 2.3.2 |
| 24 | H, Pressure regulator signal board +5 VDC ground | 2.4.2.3 |
| 23,22 | +12 VDC (power to autopilot and radiator fan) | 2.4.1 |
| 21,20 | +5 VDC (power to Servos) | 2.4.2 |
| 19 | Propulsion motor tachometer signal out | 3.3.4 |
| 18 | RS-232 transmit to autopilot from FC electronics | 2.3.5 |
| 17, 16 | No connect (formerly signal ground) | |
| 15 | Interlock switch | 2.3.3 |
| 14 | +5 VDC power to the propulsion motor controller | 2.4.2.2 |
| 13 | No connection (formerly tachometer input to FC electronics) | |
| 12 | No connection (formerly radiator fan drive power) | |
| 11 | Power ground for the radiator fan motor controller | 2.4.1.4 |
| 10 | +5 VDC for the H, pressure regulator signal board | 2.4.2.3 |
| 9 | RS-232 receive from H, pressure regulator signal board to FC electronics | 2.3.2 |
| 8,7 | +12 VDC (power to autopilot and radiator fan) | 2.4.1 |
| 6-4 | +5 VDC (power to servos) | 2.4.2 |
| 3 | Autopilot throttle signal | 2.3.1 |
| 2 | RS-232 receive from autopilot to FC electronics | 2.3.5 |
| 1 | No connection (formerly signal ground) | |

2.8.1 Physical interfaces between the FC electronics and other electronics have connectors (are not hard-wired).

2.8.2 All of the signal and low power (5 VDC and 12 VDC) lines share a single 44-pin female D-sub connector on the FC system electronics board.

2.8.3 A cable connects the FC electronics to other components in the aircraft nose (radiator fans, propulsion motor controller) and to a bulkhead connector between the nose and fuselage. There is a 44-pin male D-sub connector on the end of this cable that interfaces with the FC electronics, and a 25-pin male D-sub connector at the bulkhead.

2.8.4 The high power lines share a single connector on the FC electronics.

2.8.4.1 The high power connector on the FC electronics is a 5-pin 5W5 female D-sub.

2.8.4.2 Pin assignments for the high power connector:

Pin Assignments for the 5-pin D-sub connector on the FC electronics board

| Pin Number(s) | Pin Assignment | Node |
|---|---|---|
| 5 | Propulsion power | 2.4.3 |
| 4 | Propulsion power ground | 2.4.3 |
| 3 | No connection | |
| 2 | startup/backup battery power | 2.4.4 |
| 1 | startup/backup battery ground | 2.4.4 |

2.8.5 See the Fuel Cell and Nose Wiring Schematic for details of the physical interconnections between the FC system and other components.

2.8.6 The signal and power grounds in the FC electronics are separated by a 10 mΩ resistor so that the difference in potential between them does not become too large. Sending too much current into the signal ground will cause this resistor to fail, which allows the two grounds to float apart in potential and damage the FC electronics processor.

2.8.7 All components attached to the FC electronics board sink current in the power ground, except for the $H_2$ pressure regulator signal board, which sinks current in the signal ground.

2.8.8 Multiple pins in the 44-pin D-sub connector on the FC electronics are used for the +5VDC, +12 VDC and power ground lines to avoid exceeding the pin current capacity. The pins associated with each of these lines are coupled together just outside of the connector.

3 Aircraft 3.1 Fuselage, Mounts and Controls 3.1.1 Construction: Fuselage is carbon fiber, the wings and horizontal surfaces are fiberglass over foam.

3.1.2 Wingspan: 5.18 m (17 ft)

3.1.3 Servo quantity/manufacturer/model: 6/JR/NSE 3121

3.1.4 The FC system tray mounts in the aircraft using two pins at one end of the tray and two threaded fasteners at the other end. The pins are captured by two holes in the aircraft and are prevented from moving by the screws, which are threaded into holes in the aircraft.

3.1.5 Mounts for fuel tank: Foam bulkheads with circular holes cut in them to cradle the tank. A stop is included near the aft end of the fuselage against which the tank rests.

3.1.6 The FC cathode exhaust and anode purge are ducted out of the fuselage in such a way that they will not be drawn into the cathode inlet. The tubing carrying each flow passes through a hole in the fuselage and protrudes slightly beyond the outer skin of the fuselage.

3.1.7 Coolant is carried from the FC system to the radiator and from the radiator to the FC system by silicone rubber tubing. At the FC system the tubing is pressed onto barb fittings on the bypass valve assembly.

3.1.8 There is a 25-pin bulkhead connector that carries signal and power lines between the nose and fuselage. The pin assignments are as follows:

Pin Assignments for the 25-pin D-sub bulkhead connector

| Pin Number(s) | Pin Assignment | Node |
|---|---|---|
| 25-19 | Power ground | |
| 18 | Tachometer signal | |
| 17-14 | No connection | |
| 13-11 | +5 VDC (power to servos) | 2.4.2 |
| 10-8 | +12 VDC (power to autopilot) | 2.4.1 |
| 7 | Cable shield ground for pins 4, 6, 18 | 2.3.6 |
| 6 | +5 VDC (power to tachometer) | |
| 5 | No connection | |
| 4 | Autopilot throttle signal | 2.3.1 |
| 3 | RS-232 transmit to autopilot from FC electronics | 2.3.5 |
| 2 | RS-232 receive from autopilot to FC electronics | 2.3.5 |
| 1 | Cable shield ground for pins 2 and 3 | 2.3.6 |

Note that while pins 25-19 are collectively power ground on the FC electronics side of the bulkhead connector, on the autopilot side pins 25-23 and 19 are ground for the +5 VDC and pins 22-20 are ground for the +12 VDC. See Fuel Cell and Nose Wiring Schematic for details.

3.2 Propulsion 3.2.1 Motor controller Manufacturer/Model: Castle Creations/Phoenix HV45

3.2.2 Motor controller software settings:

Ion Tiger Propulsion Motor Controller Settings in the Castle Creations Castlelink Software Brake Ramp: Very Slow Brake Delay: 1 sec
Cutoff Voltage: Custom 4.0 Motor Start Power: 39
Hex55: 85 Throttle Response: 5
Brake Strength: 10 Motor Timing: Normal (x)
Direction: Forward (x) Cutoff Type: Soft Cutoff
Spool-up Speed: 4 PWM Rate: 12 khz (x)
Throttle Type: Airplane: Fixed Endpoints Governor Gain: 50
Current Limiting: Disabled 3.2.3 Motor type/Manufacturer/Model: Brushless DC/Neu/11152Y6.7

3.2.4 Propeller size/manufacturer: 15-13/Aeronaut 3.2.5 The propeller is mounted on a hub with 4° of twist, which results in a total propeller diameter of 18 inches.

3.2.6 A Hall Effect propeller shaft tachometer reports propeller speed to the autopilot.

3.2.6.1 Format for the signal: Pulses/sec. Each time the propeller shaft rotates once, a magnet induces a voltage pulse in the Hall Effect sensor. The pulses are converted into rotations/sec at the ground station.

3.2.6.2 The Hall Effect sensor requires +5 VDC power in addition to the signal line.

3.3 Autopilot 3.3.1 Manufacturer/model: CloudCap/Piccolo II 3.3.2 GPS antenna connection via coaxial cable, SMA connector at autopilot.

3.3.3 Autopilot communicates with the ground station using an internal radio modem and transmitter connected to an external UHF antenna via an SMA connector and coaxial cable.

3.3.3.1 Uplink/downlink frequencies: 900 MHz 3.3.3.2 Transmitter power: 1 W 3.3.4 There is a pitot tube mounted on the outside of the fuselage and connected to the autopilot to provide dynamic pressure data. Flexible PVC tubing carries pressure from the pitot tube to a single barb fitting on the autopilot.

3.3.5 There is a second barb fitting on the autopilot that is left unconnected; this reads the static pressure in the fuselage.

3.3.6 Pin assignments for the 44-pin female D-sub connector on the autopilot:

| Pin Assignments for the 44-pin D-sub connector on the autopilot | | |
|---|---|---|
| Pin Number(s) | Pin Assignment | Node |
| 44 | Left aileron signal | |
| 43 | Left elevator signal | |
| 42 | Throttle signal out to FC electronics | 2.3.1 |
| 41 | Left rudder signal | |
| 40 | No connection | |
| 39 | Right aileron signal | |
| 38 | Right elevator signal | |
| 37-35 | No connection | |
| 34 | RS-232 transmit from autopilot to FC electronics | 2.3.5 |
| 33 | RS-232 receive from FC electronics to autopilot | 2.3.5 |
| 32, 31 | No connection | |
| 30 | +5 VDC to the left aileron servo | |
| 29 | +5 VDC to the elevator and rudder servos | |
| 28, 27 | No connection | |
| 26 | +5 VDC to the RPM sensor | |
| 25 | +5 VDC to the right aileron servo | |
| 24 | No connection | |
| 23 | +5 VDC in from the FC electronics | |
| 22-16 | No connection | |
| 15 | Power ground for the left aileron servo | |
| 14 | Power ground for the elevator and rudder servos | |
| 13 | Cable shield ground for autopilot pins 42, 26 and 5 | 2.3.6 |
| 12, 11 | No connection | |
| 10 | Power ground for the right aileron servo | |
| 9 | Cable shield ground for autopilot pins 44, 43, 41,39, 38, 30, 29, 25, 15, 14, 10 and 9 | 2.3.6 |
| 8 | Power ground for + 5 VDC from the FC electronics | |
| 7, 6 | No connection | |
| 5 | RPM signal in from the tachometer | |
| 4 | No connection | |
| 3 | Cable shield ground for autopilot pins 33 and 34 | |
| 2 | Power ground for +12 VDC from the FC electronics | |
| 1 | +12 VDC from the FC electronics | |

3.4 Payload 3.5 Payload video transmitter 3.6 Startup/Backup Battery 3.6.1 Manufacturer/Model: A123 Systems/26650

3.6.2 Description: Pack of 4 $LiFePO_4$ cells in series 3.6.3 Battery pack capacity: 2.3 A·hr 3.6.4 Nominal/maximum battery pack voltage: 13.2 V/14.4 V 3.6.5 Maximum charge/continuous discharge/pulse discharge current: 10 A/70 A/120 A (10 sec pulse)

3.6.6 The FC electronics draw power from the startup/backup battery in order to:

1) Start the FC system

2) Support the FC electronics and avionics loads during fuel cell shorts

3) Support the electronics and avionics loads during and restart the FC system after soaring (if implemented)

4 Fuel Storage 4.1 Hydrogen storage tank—example 4.1.1 Tank construction: Aluminum lined, carbon fiber wrapped pressure vessel.

Liner has been chemically etched to achieve the desired thickness.

4.1.2 Maximum working pressure: 5000 psi 4.1.3 Internal volume: 22 L 4.1.4 Burst pressure safety factor at maximum working pressure: 1.5

4.1.5 Interface with pressure regulator: ¾—inch-16 internal threads in the aluminum liner.

4.1.6 Tank dimensions: Length 635 mm and diameter 110.5 mm. Ends of the cylinder are isotensoid domes.

4.2 Hydrogen pressure, single stage regulator 4.2.1 Regulator source: NRL (design and assembly)

4.2.2 Tank is filled via a quick disconnect fitting; the quick disconnect manufacturer/part number are:

1) On the regulator side: Swagelok/SS-QM2-S-2PM

2) On the supply side: Swagelok/SS-QM2-B-2PM 4.2.3 High pressure $H_2$ pressure relief valve vent pressure: 5200 psi. This part is excluded from the newest regulators.

4.2.4 Low pressure $H_2$ pressure relief valve vent pressure: 30 psi 4.2.4.1 The regulator outlet pressure rises ~1.7 psi for every 1000 psi drop in the tank pressure.

4.2.4.2 When the FC is running, the regulator outlet pressure falls ~4 psi below the no-flow pressure.

4.2.4.3 The regulator must supply $H_2$ at a pressure greater than the minimum inlet pressure for the FC. Setting the no-flow regulator output pressure to 20 psi when the tank pressure is 5000 psi will ensure sufficient $H_2$ pressure:

1) The flowing $H_2$ pressure at the regulator outlet will initially be 16 psi (20 psi-4 psi).

2) As the tank empties, the flowing $H_2$ pressure at the regulator outlet will rise to 27 psi.

4.2.5 $H_2$ output pressure is adjusted by turning a screw in the center of the diaphragm, which controls the initial deflection of the diaphragm.

4.3 Hydrogen pressure sensors 4.3.1 There are two sensors, powered and read by an electronics board attached to the regulator.

4.3.1.1 High pressure $H_2$ pressure sensor: Omega P/N: PX600-200GV 4.3.1.2 Low pressure $H_2$ pressure sensor: Omega P/N: PX600-5KGV 4.3.2 There is a data output line from the signal conditioning board, which is read by the FC electronics 4.3.3 There is a data input line to the signal conditioning board that is used for calibrating the pressure sensors or modifying operation of the board.

5 Ground Station 5.1 Ground control station 5.1.1 Ground control station software: Piccolo version 2.0

5.1.2 One computer is used for control and monitoring of the aircraft, another is used for control and monitoring of the FC system. Both are connected to the ground station interface box, which provides the connection between the computers and airplane.

6 Cooling 6.1 Mass and Thermal Interfaces 6.1.1 Coolant leaves the FC system (measured just after the exit barb fitting) at ≤75° C.

6.1.2 Coolant is returned to the FC system (measured in the coolant pump reservoir) at ≤70° C.

6.1.3 Coolant 6.1.4 Maximum coolant flow rate through the radiator (bypass valve closed): ≥1.7 L/min 6.1.5 Maximum coolant pressure drop at the coolant flow rate in 6.1.4:

Through the stack: 1.0 lb/in$^2$

Through the radiator: 1.0 lb/in$^2$ 6.2 Key Parameters 6.2.1 Worst case heat rejection at cruise power predicted by the FC stack thermal model To the radiator: ~148 W To the cathode flow: ~106 W 6.2.2 Worst case heat rejection at full power predicted by the FC stack thermal model To the radiator: ~404 W To the cathode flow: ~223 W 6.2.3 Maximum electronics board (MOSFET) operating temperature: 110° C.

6.3 Radiator 6.3.1 Radiator type: Aluminum compact heat exchanger with tubes and louvered fins. Coolant inlet and outlet are located at opposite corners.

6.3.2 Radiator location: Internal, with air ducted through it 6.3.3 Two fans in a custom housing pull air through the radiator.

6.3.4 There is a "de-bubbler" tank connected to one upper corner of the radiator and to the top of the coolant pump reservoir. Connections are via silicone tubing with tubing clamps holding it in place. This tank allows air to escape from the system and ensures that the coolant pump remains primed. There is a port in the top of the tank (with a plastic cap) through which coolant can be added to the system.

6.3.5 Coolant flow lines consist of ¼ inch inside diameter, ⅜ inch outside diameter silicone rubber tubing with a durometer of 70 A. McMaster-Carr part number 51135K77. Total length included is 52 cm.

6.3.6 Lines running to the de-bubbler tank are 3/16 inch inside diameter and 5/16 inch outside diameter with a durometer of 70 A. McMaster-Carr part number 51135K74. Total length included is 53 cm.

6.3.7 A straight barbed connector was added to the middle of the tube carrying coolant from the FC to the radiator to aid in the fuel cell installation process. This may be removed for flight testing, because it adds pressure drop to the coolant loop.

7 Definitions/Properties 7.1 Standard liter per minute (SL/min): A flow rate equivalent to one liter of gas at 0° C. and 1 ATM passing through a control surface over one minute.

7.2 FC operating temperature: The temperature of coolant at the exit of the FC system.

7.3 Fuel utilization: the fraction of fuel entering the FC that is reacted to produce electricity, i.e. the fraction of fuel that is not purged to the atmosphere.

7.4 Net electrical efficiency of the FC system: (net electrical power from FC system)/($H_2$ mass flow rate*$H_2$ HHV). A measure of the electrical energy available to aircraft systems from the stored $H_2$. Note that this is NOT the same as the thermal efficiency of the stack.

7.5 FC net electrical power: power available from the FC system for components external to it, i.e. the stack output minus power consumed by the balance of plant and FC electronics.

7.6 Peak FC net electrical power: maximum FC net electrical power when it is running in operating temperature range.

7.7 FC operating temperature range: Preferred temperature range for FC. Operation within this range should not lead to flooding or dry out.

7.8 Higher Heating Value (HHV) of $H_2$ gas: 141,900 J/g or 39,410 Wh/kg.

7.9 Specific heat of water: 4.186 J/(g·K)

Figure 14:
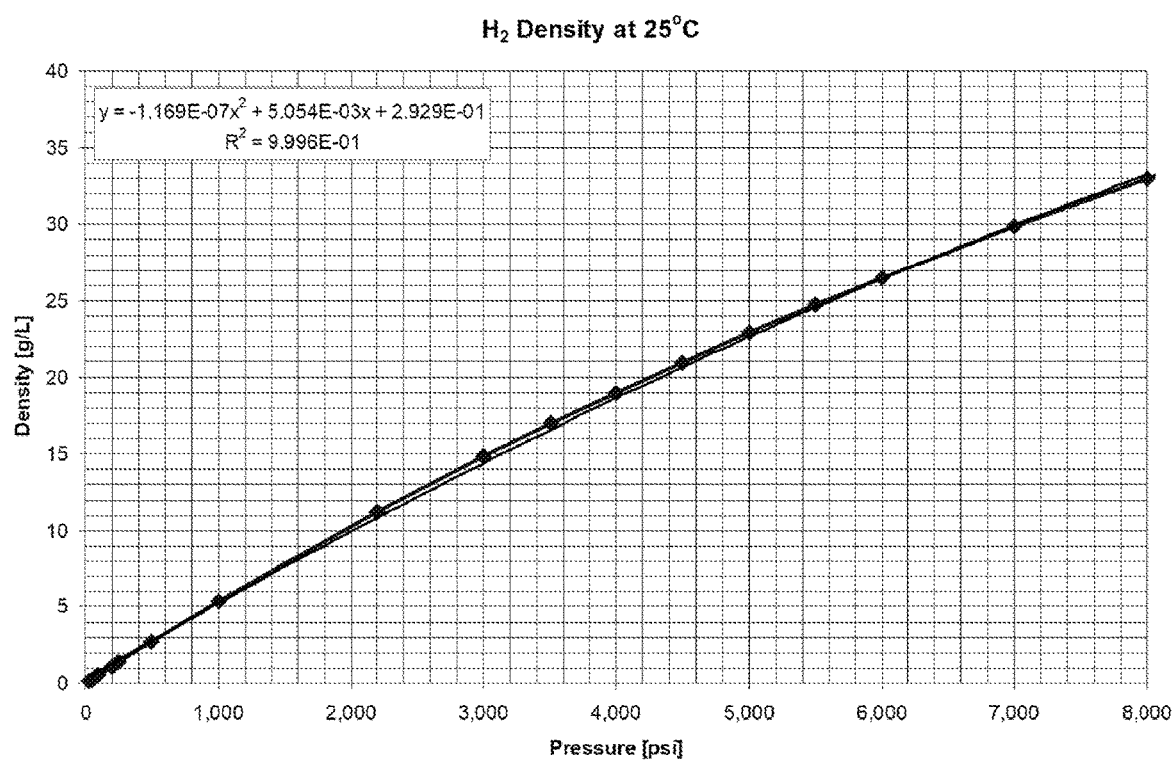
FIG. 14 shows hydrogen density as a function of pressure.

7.10 Density of $H_2$ gas at 25° C. and 5000 lb/in$^2$: 22.9 g/L. See FIG. 14.

7.11 Density of the coolant (see §6.1.3) assuming it is a weighted average of the densities of the components: 1.007 g/cm$^3$@20° C.

7.12 Ullage: The mass of fuel remaining in the tank when it is "empty", i.e. no more fuel can be withdrawn.

8 Flight Endurance Estimate 8.1 The following fuel consumption rates were measured in the 2009.08.25 flight at Aberdeen Proving Grounds:

| Parameter | Value | Unit | Value | Unit |
|---|---|---|---|---|
| Rate of fuel consumption, takeoff | 437 | psi/hr | 42.1 | g/hr |
| Rate of fuel consumption, daytime | 237 | psi/hr | 23.7 | g/hr |
| Rate of fuel consumption, nighttime | 139 | psi/hr | 14.9 | g/hr |

8.2 Assuming a 10 min climb-out from launch, 10 hrs daylight, 14 hrs nighttime, and 500 g $H_2$ in the tank at launch, the estimated amount of fuel remaining at the end of the 24 hr flight is 47 g. This is 9.4% of the amount in the full tank, and sufficient for ~2 hr of flight at the daytime consumption rate.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A system comprising:
   a hydrogen fuel cell characterized by:
      a minimum continuous power output of no more than 25 W;
      a maximum continuous power output of no less than 5000 W;

an ability to operate at least 2 psig of hydrogen at an inlet; and an ability to operate at temperatures up to 90° C.;

a fuel storage tank;

a regulator coupled to the storage tank and the fuel cell;

an electronic auto pilot;

a rechargeable battery;

a power electronics module for delivering power from the fuel cell to the autopilot and the battery; and a heat exchanger coupled to the fuel cell;

wherein the system has a specific power of at least 200 W/kg based on the mass of the fuel cell and any control electronics, cooling components, air delivery components, and water management components.

2. The system of claim 1, wherein the storage tank and regulator are capable of storing at least 4% hydrogen by weight.

3. The system of claim 1, wherein the regulator is a single stage regulator capable of delivering 0.06-0.08 g/hr/$W_{fuel\ cell\ output}$ of hydrogen gas at 4-30 psi when the storage tank contains compressed or liquid hydrogen.

4. An unmanned aerial vehicle comprising the system of claim 1.

5. The vehicle of claim 4, further comprising:

an electronic component capable of radio communication with a ground station.

* * * * *